(12) United States Patent
Vanberg et al.

(10) Patent No.: US 9,945,578 B2
(45) Date of Patent: Apr. 17, 2018

(54) MONITORED HEAT EXCHANGER SYSTEM

(71) Applicant: GLOBAL HEAT TRANSFER ULC, Edmonton (CA)

(72) Inventors: Randy Vanberg, Tomball, TX (US); Hamid Reza Zareie Rajani, Edmonton (CA); Seyed Reza Larimi, Edmonton (CA); Morteza Abbasi, Edmonton (CA)

(73) Assignee: Global Heat Transfer ULC, Edmonton (CA)

( * ) Notice: Subject to any disclaimer, the term of this patent is extended or adjusted under 35 U.S.C. 154(b) by 0 days.

(21) Appl. No.: 15/719,099

(22) Filed: Sep. 28, 2017

(65) Prior Publication Data
US 2018/0017279 A1    Jan. 18, 2018

Related U.S. Application Data

(63) Continuation of application No. 15/705,024, filed on Sep. 14, 2017, which is a continuation-in-part of
(Continued)

(51) Int. Cl.
*B60H 1/00* (2006.01)
*F24F 11/00* (2018.01)
(Continued)

(52) U.S. Cl.
CPC .......... *F24F 11/0086* (2013.01); *F24D 19/10* (2013.01); *F24F 11/001* (2013.01);
(Continued)

(58) Field of Classification Search
CPC ...... F24F 11/0086; F24F 11/02; F24F 11/006; F24F 11/001; F24H 9/20; F28F 27/00
(Continued)

(56) References Cited

U.S. PATENT DOCUMENTS 2,505,999 A    5/1950  Smith
4,747,275 A *  5/1988  Amr ..................... F24F 1/0007
                                                 165/121
(Continued)

FOREIGN PATENT DOCUMENTS

WO    WO2016079674    5/2016

OTHER PUBLICATIONS

Enerflow 3512 frac truck brochure, L&M Radiator Inc., copyright notice dated 2011 (2 pgs).
(Continued)

*Primary Examiner* — Len Tran
*Assistant Examiner* — Claire Rojohn, III
(74) *Attorney, Agent, or Firm* — Rao DeBoer Osterrieder, PLLC; John M. DeBoer

(57) ABSTRACT

A monitored heat exchanger system that includes a heat exchanger unit in operable engagement with a heat generating device, with an at least one service fluid being transferable therebetween, and a monitoring module coupled to the heat exchanger unit. The monitoring module includes a primary microcontroller in operable communication with an at least one sensor assembly. The at least one sensor assembly includes a mounting frame; a support platform; a circuit board; an inner sensor housing configured to extend out and around the circuit board and the support platform; a first magnet coupled to an underside of the inner sensor housing; and a rotating member comprising a plurality of blades, the rotating member being disposed on top of the inner sensor housing.

20 Claims, 12 Drawing Sheets

Related U.S. Application Data application No. 15/591,076, filed on May 9, 2017, which is a continuation-in-part of application No. 15/477,097, filed on Apr. 2, 2017.

(60) Provisional application No. 62/320,606, filed on Apr. 10, 2016, provisional application No. 62/320,611, filed on Apr. 10, 2016.

(51) Int. Cl.
    *F24F 11/02* (2006.01)
    *F24D 19/10* (2006.01)
    *F28F 27/00* (2006.01)
    *F24H 9/20* (2006.01)

(52) U.S. Cl.
    CPC ............ *F24F 11/006* (2013.01); *F24F 11/02* (2013.01); *F24H 9/20* (2013.01); *F28F 27/00* (2013.01); *F24F 2011/0061* (2013.01); *F24F 2011/0063* (2013.01); *F24F 2011/0091* (2013.01)

(58) Field of Classification Search
    USPC ........................................................ 165/11.1
    See application file for complete search history.

(56) References Cited

U.S. PATENT DOCUMENTS

| | | | |
|---|---|---|---|
| 5,526,871 A | 6/1996 | Musser et al. | |
| 5,879,466 A | 3/1999 | Creger et al. | |
| 6,126,681 A | 10/2000 | Van Duren et al. | |
| 6,240,774 B1 | 6/2001 | Niki et al. | |
| 6,286,986 B2 | 9/2001 | Grimland et al. | |
| 6,389,889 B1 | 5/2002 | Ford | |
| 6,630,756 B2 | 10/2003 | Kern et al. | |
| 6,644,844 B2 | 10/2003 | Neal et al. | |
| 6,681,619 B2 | 1/2004 | Alleving et al. | |
| 7,210,194 B2 | 5/2007 | Kiern | |
| 7,845,413 B2 | 12/2010 | Shampine et al. | |
| 8,215,833 B2 | 7/2012 | Kouda et al. | |
| 8,347,427 B2 * | 1/2013 | Klicpera | B05B 12/008 4/643 |
| 8,649,931 B2 * | 2/2014 | Nishizawa | F01P 5/14 701/29.1 |
| 9,103,193 B2 | 8/2015 | Coli et al. | |
| 9,109,594 B2 * | 8/2015 | Pawlick | F04B 53/08 |
| 9,404,417 B2 | 8/2016 | Norrick et al. | |
| 2005/0159846 A1 | 7/2005 | Van Ostrand et al. | |
| 2011/0066298 A1 | 3/2011 | Francino et al. | |
| 2011/0192578 A1 * | 8/2011 | Lang | F01P 3/18 165/104.34 |
| 2011/0282619 A1 * | 11/2011 | Laursen | G01K 1/022 702/130 |
| 2014/0008074 A1 | 1/2014 | Nevison | |
| 2014/0365195 A1 * | 12/2014 | Lahiri | G06F 19/702 703/12 |
| 2015/0047811 A1 * | 2/2015 | Kappelman | B60K 11/04 165/96 |
| 2015/0252661 A1 | 9/2015 | Glass | |
| 2015/0362207 A1 * | 12/2015 | Abiprojo | F24F 11/0086 702/183 |
| 2016/0146487 A1 | 5/2016 | Zywiak | |
| 2016/0305865 A1 * | 10/2016 | Silva | G01N 17/008 |

OTHER PUBLICATIONS

World Academy of Science, Engineering and Technology, vol. 6 Nov. 28, 2012, "CFD Modeling of a Radiator Axial Fan for Air Flow Distribution", date of publication indicated as 2012 (6 pgs).

* cited by examiner

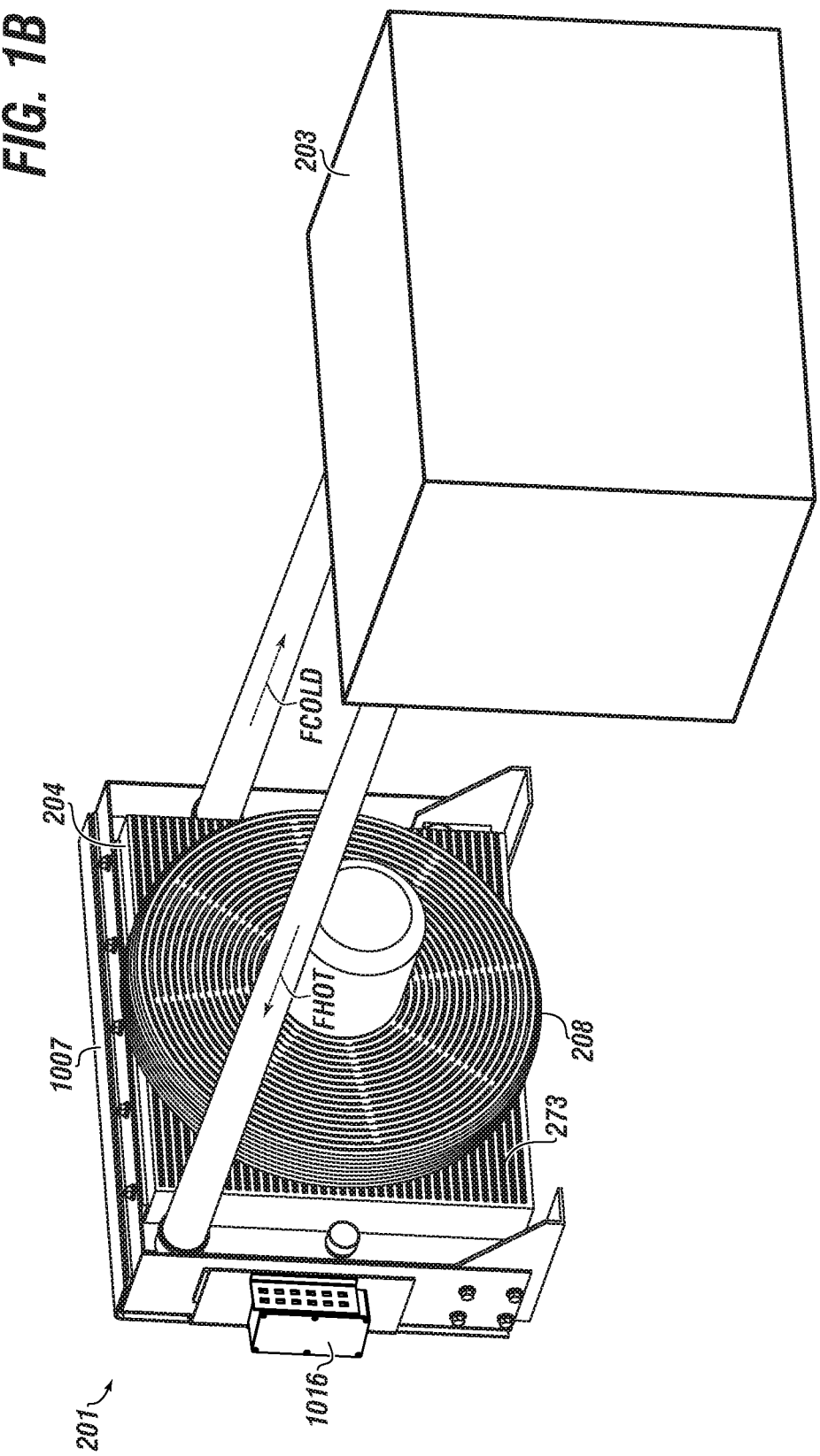

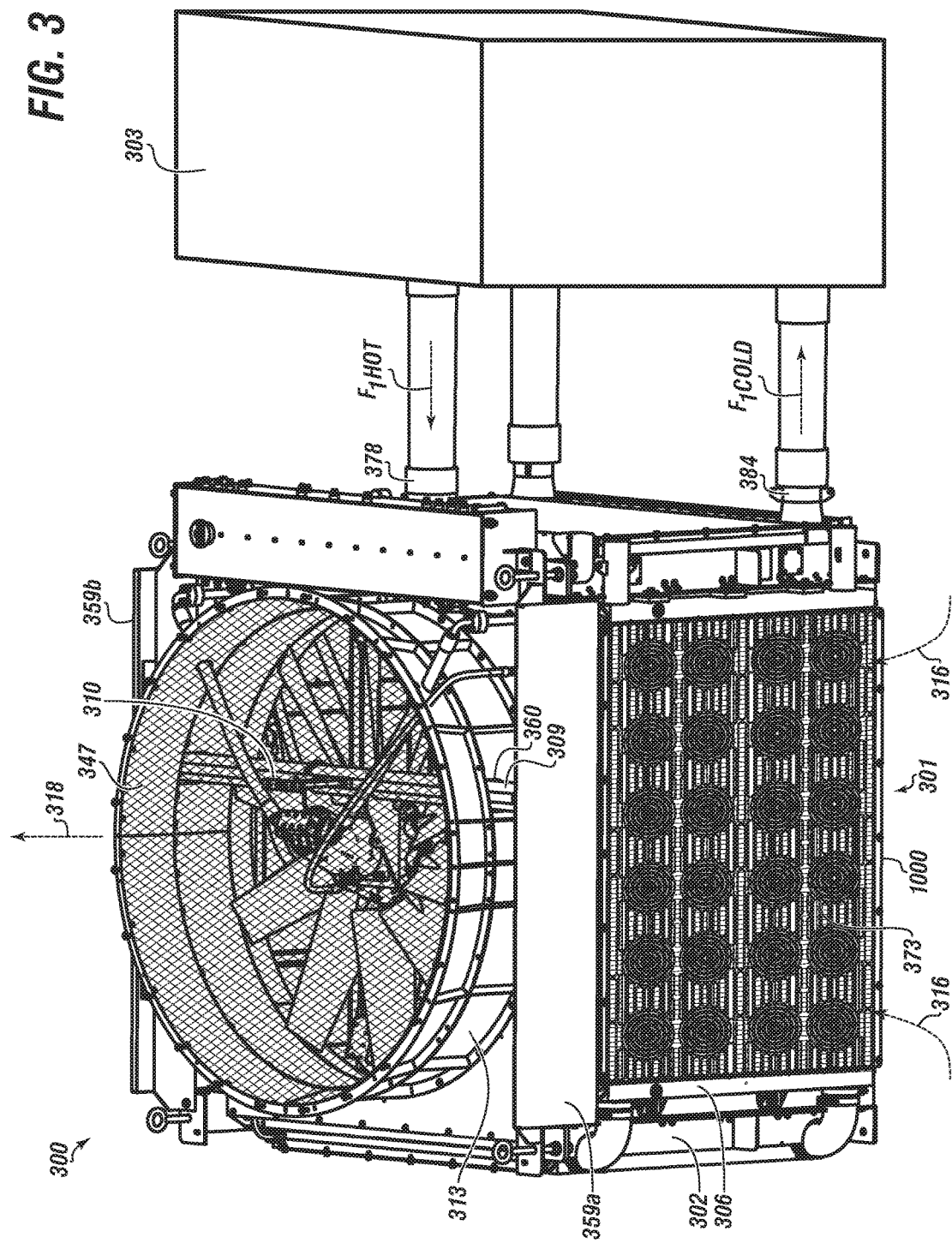

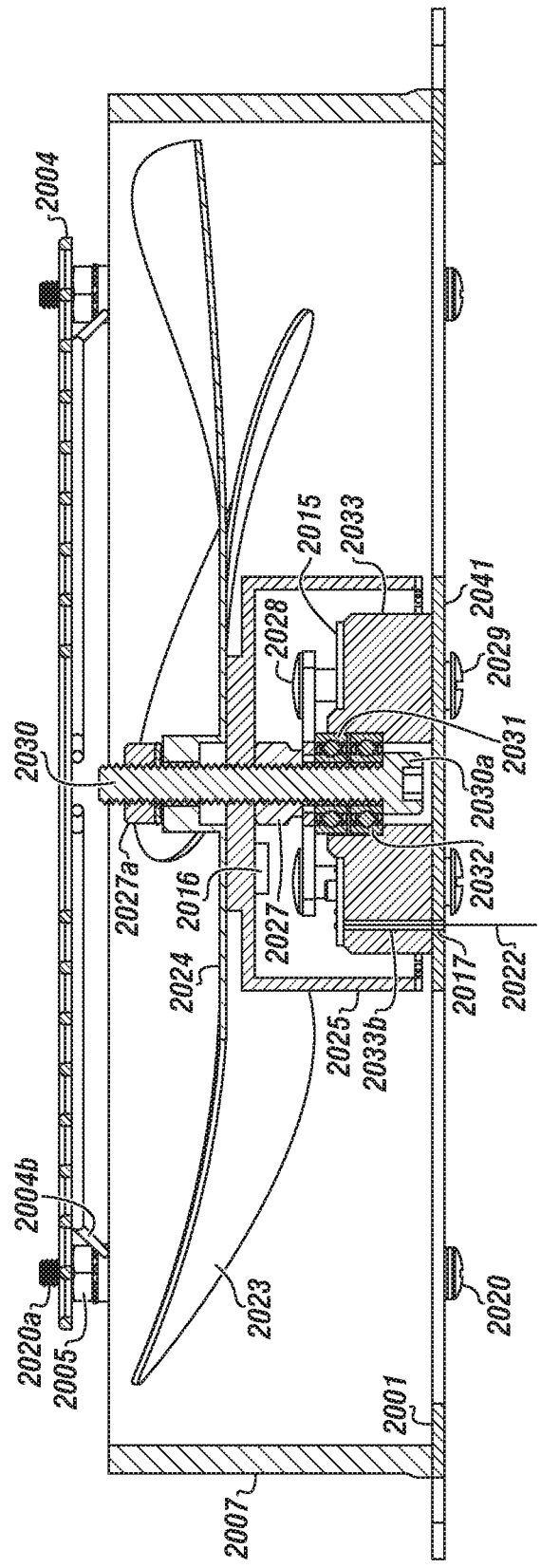

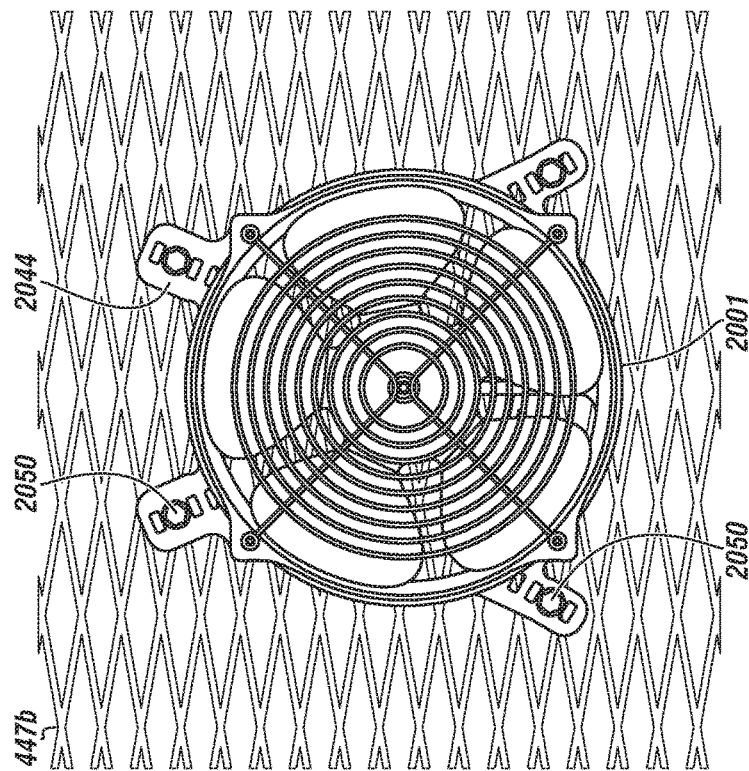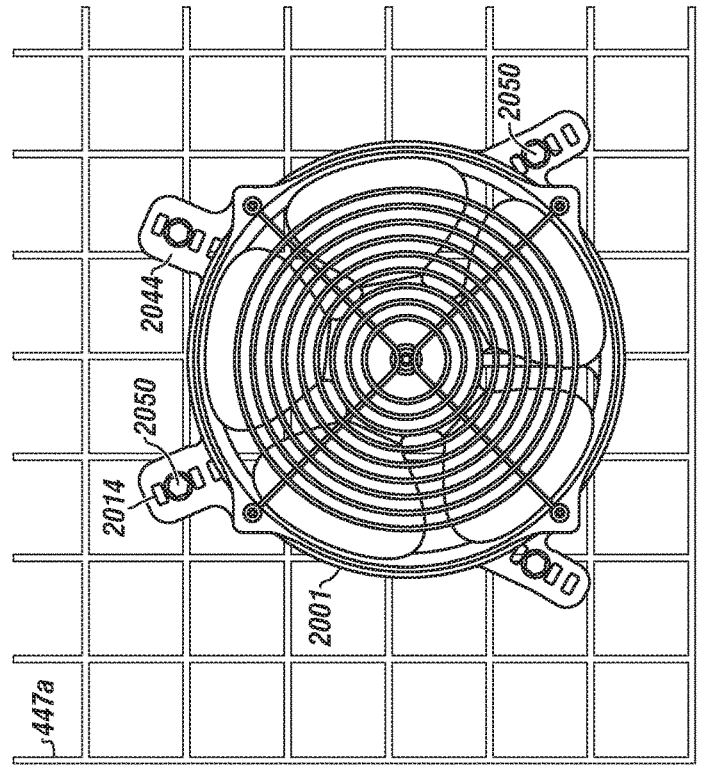

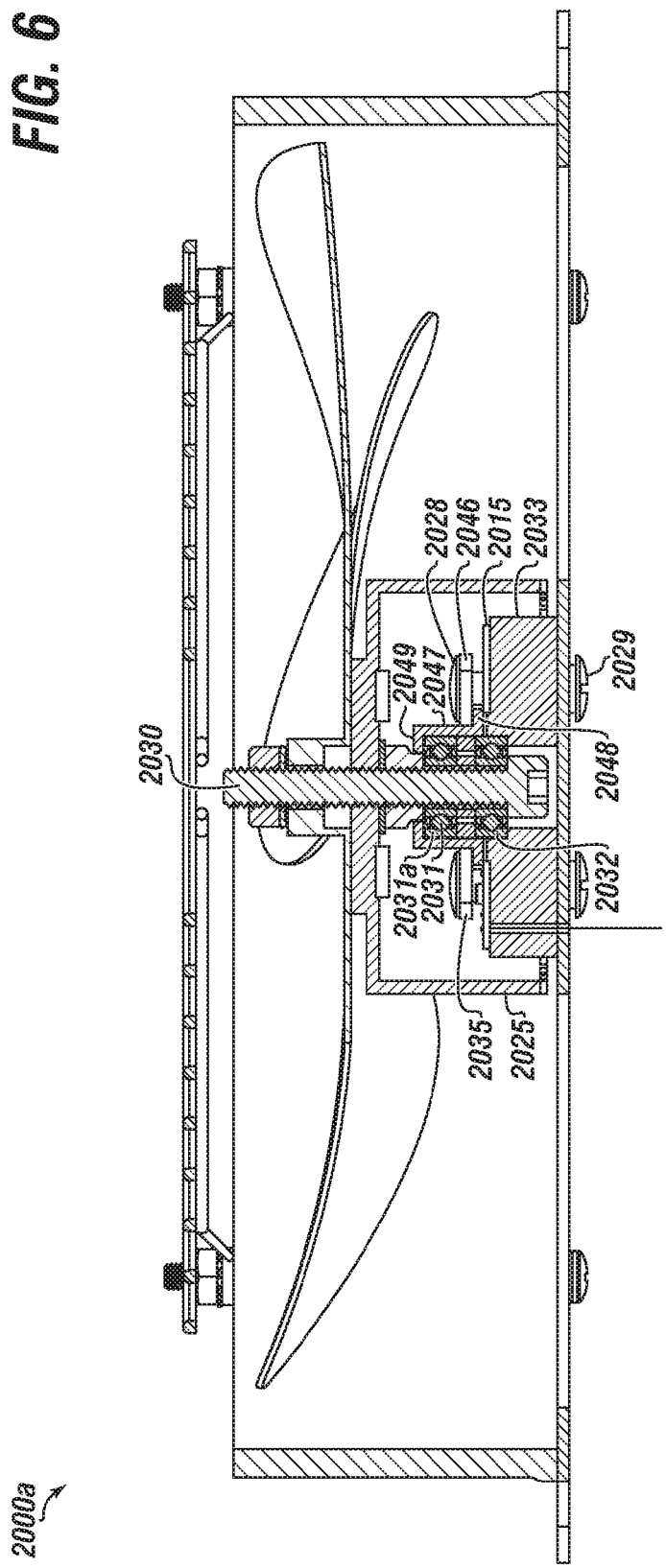

MONITORED HEAT EXCHANGER SYSTEM

CROSS-REFERENCE TO RELATED APPLICATIONS

This application is a continuation of U.S. non-provisional application Ser. No. 15/705,024, filed Sep. 14, 2017, which is a continuation-in-part of U.S. non-provisional application Ser. No. 15/591,076, filed May 9, 2017, which is a continuation-in-part of U.S. non-provisional application Ser. No. 15/477,097, filed Apr. 2, 2017, which claims the benefit under 35 U.S.C. § 119(e) of U.S. Provisional Patent Application Ser. No. 62/320,606, filed on Apr. 10, 2016, and of U.S. Provisional Patent Application Ser. No. 62/320,611, filed on Apr. 10, 2016. The entirety of each application is incorporated herein by reference in entirety for all purposes.

INCORPORATION BY REFERENCE

The subject matter of co-pending U.S. non-provisional application Ser. No. 15/629,563, filed Jun. 21, 2017, Ser. No. 15/591,076, filed May 9, 2017, and Ser. Nos. 15/477,097 and 15/477,100, each filed Apr. 2, 2017, is incorporated herein by reference in entirety for all purposes. One or more of these applications may be referred to herein as the "Applications".

STATEMENT REGARDING FEDERALLY SPONSORED RESEARCH OR DEVELOPMENT

Not Applicable.

BACKGROUND

Field of the Disclosure

This disclosure generally relates to a heat exchanger unit with characteristics of improved: airflow, noise reduction, cooling efficiency, and/or structural integrity. Other aspects relate to a system for monitoring airflow through a heat exchanger unit, or fouling related thereto. In particular embodiments, a monitoring module is mounted externally to the heat exchanger unit of a monitored system, the system being usable to monitor fouling of the unit, and provide an associated warning. The monitoring module may be operably associated with a durable, rugged airflow sensor assembly.

Background of the Disclosure

Whether its refrigeration, hot showers, air conditioning, and so on, the function of heating and cooling is prevalent in today's residential and industrial settings. One area of relevance is the oil and gas industry, including exploration, upstream, and downstream operations where the ability to heat and/or cool is critical. Upstream operations can include drilling, completion, and production, whereas downstream operations can include refining and other related hydrocarbon processing, all of which utilize a vast amount of process equipment including that which provide heat transfer. To be sure, the background of the disclosure is relevant elsewhere, but for brevity discussion is focused on O&G.

Common settings are nothing short of challenging in the sense that in many instances operations and processes (and related equipment) are exposed to environmental conditions, such as extreme heat, cold, wind, and dust (including natural amounts of particulate, as well as that caused by the operation of equipment and vehicles).

It is routine to have (indeed, need) some type of heat exchange ability in such settings. As set forth in U.S. Ser. No. 15/477,097, an example operation in an industrial setting may include one or more frac pump units. Each unit is typically operable with a pump and engine mounted or otherwise disposed thereon, as well as a radiator (or analogously referred to as cooler, heat exchanger, etc.). As mentioned before, equipment like this must be rugged and durable in order to have long-term operational capacity and effectiveness.

The radiator is configured for cooling one or more hot service fluids associated with the equipment of the frac pump unit, such as lube oil or jacket water. The radiator typically includes a 'core' of stacked fins, with one part of the core providing a flow are for the service fluid(s), while another part of the core provides a proximate, albeit separate, flow area for ambient air. A fan is used to blow or pull air through the stacked fins, the air being a low or moderate enough temperature to cool the service fluid, which is then recirculated in a loop.

The stacked fins often have a configuration that is tantamount to an extensive amount of small air passageways proximate to (albeit separate from) service fluid passageways, whereby the air and the service fluid can 'exchange heat' via the surface material of the stacked fins between the passageways (e.g., aluminum).

Over time airborne dirt in and other particulate in the air will begin to deposit on the air intake side (and elsewhere), resulting in a fouled radiator. Fouling can seriously deteriorate the capacity of the surface of the fins to transfer heat under the conditions for which they were designed. Among other problems, the fouling layer has a low thermal conductivity which increases the resistance to heat transfer and reduces the effectiveness of heat exchangers. In addition, fouling reduces the cross-sectional area in the passageways, which causes an increase in pressure drop across a heat exchanger.

Radiator fouling affects both capital and operating costs of heat exchangers (and overall processes). Higher capital expenditures include that for excess surface area (for heat transfer), extra space, and transport and installation costs. Operating expenditures include that for energy losses due to the decrease in thermal efficiency, increases in the pressure drop through process equipment, and production losses during planned and unplanned plant shutdowns for fouling cleaning.

Moreover, government emissions regulations are forcing engine manufacturers and their customers to reduce emissions from reciprocating engines. Current solutions involve returning the exhaust through heat exchange, which elevates combustion temperature and puts significantly more heat into the cooling system. Tier 4 Final (US and CA) Emission regulations come into effect in 2017 & 2020 will force end users into significant equipment redesign industry wide. See, e.g., http://www.assocpower.com/eqdata/tech/US-EPA-Tier-Chart_2004-2017.php, for general reference.

In summary, fouling of heat transfer surfaces is one of the most important problems in heat transfer equipment. Some have described fouling as the major unresolved problem in heat transfer. Equipment operators world-wide are also trying to reduce maintenance costs. One of the highest maintenance costs any piece of equipment has is cooling system maintenance.

And yet despite these detriments, consideration of improved remediation or management techniques have been largely ignored and unchanged. Conventional techniques include mitigation (such as upstream filtering) and chemical treatment.

Mechanical cleaning is also used, but only during predetermined periodic intervals, namely during a planned shutdown or when an exchanger reaches a point of failure and is no longer operable. This approach relies on extensive cost and resource being allocated toward the antiquated philosophy of operational redundancy.

There is a need in the art to overcome deficiencies and defects identified herein. There is a need in the art to reliably monitor fouling of a radiator. There is a need in the art to provide a real-time warning indication about fouling conditions of a radiator.

There is a need in the art for a monitoring system that is durable for use in outdoor and other difficult environmental conditions. There is a need in the art for a monitoring system capable of high degree of sensing accuracy, yet impervious to or otherwise able to withstand external conditions. There is a further need for an improved rugged sensor assembly suitable for ongoing and extended use in association with the monitoring system in extreme environmental conditions.

There is a need in the art for a method of doing business that includes monitoring and servicing of radiators, especially when the radiator reaches various stages of fouling or provides other indication requiring attention. There is a need in the art to clean a fouled radiator with little or no downtime.

There is a need in the art for a monitoring module that can be retrofitted to any existing heat exchanger, including of great importance to a heat exchanger that has one or more sides (or surfaces) exposed to ambient air.

There is a particular need in the art for a monitoring system that is readily adaptable and compatible to radiators associated with different pieces of heat generating equipment, such as an engine, a motor, a pump, or a genset useable in a wide range of settings.

SUMMARY

Embodiments herein pertain to a monitored heat exchanger system that may include a heat exchanger unit in operable engagement with a heat generating device, with an at least one service fluid being transferable therebetween. The heat exchanger unit may include a frame; and at least one cooler coupled with the frame, the at least one cooler having an airflow side and a service fluid side.

The system may include a monitoring module coupled to the heat exchanger unit, the monitoring module further having a primary microcontroller in operable communication with an at least one sensor assembly.

The at least one sensor assembly may include a mounting frame; a support platform coupled with the mounting frame, and further comprising: a platform hollow; and a top platform surface; a circuit board positioned onto the top platform surface, the circuit board being configured with a secondary microcontroller and a Hall effect sensor; an inner sensor housing configured to extend out and around the circuit board and the support platform; a first magnet coupled to an underside of the inner sensor housing; and a rotating member comprising a plurality of blades, the rotating member being disposed on top of the inner sensor housing.

In aspects, the primary microcontroller may be provided with computer instructions for processing a system signal received from the secondary microcontroller.

Other embodiments of the disclosure pertain to a monitored heat exchanger system that may include a heat exchanger unit in operable engagement with a heat generating device, with an at least one service fluid being transferable therebetween.

The heat exchanger unit may include a frame; and at least one cooler coupled with the frame, the at least one cooler having an airflow side and a service fluid side.

The system may further include a monitoring module coupled to the heat exchanger unit. The monitoring module may further include: a primary microcontroller in operable communication with an at least one sensor assembly.

The sensor assembly may include: a mounting frame configured for coupling the assembly with the heat exchanger unit, the mounting frame further comprising a central segment; a support platform coupled with the central segment, and further comprising: a platform hollow; and a top platform surface; a shaft disposed in the platform hollow; a first bearing disposed around the shaft and proximate the support platform; a circuit board positioned onto the top platform surface, the circuit board being configured with an operable logic circuit further comprising a secondary microcontroller and a Hall effect sensor; a rotating member comprising a plurality of blades, the rotating member being disposed around the shaft; and a lock nut threadingly engaged around the shaft sufficiently enough to engage a rotating member mounting ring.

In aspects, the primary microcontroller may be provided with computer instructions for processing a system signal received from the secondary microcontroller.

Yet other embodiments of the disclosure pertain to a monitored heat exchanger system that may include a heat exchanger unit in operable engagement with a heat generating device, with an at least one service fluid being transferable therebetween. The heat exchanger unit may include: a frame; and at least one cooler coupled with the frame, the at least one cooler having an airflow side and a service fluid side.

The system may include a monitoring module coupled to the heat exchanger unit, the monitoring module further having: an at least one controller housing; a primary microcontroller disposed within the controller housing and in operable communication with an at least one sensor assembly; and each of a solid data storage, a Wi-Fi module, a GSM module, and a CAN-Bus module also being disposed within the controller housing and also in operable communication with the primary microcontroller.

The at least one sensor assembly may include a rotating member configured to facilitate generation of a system signal proportional to an amount of rotation of the rotating member. In aspects, the primary microcontroller may be provided with computer instructions for processing the system signal. The amount of rotation may be dependent upon an amount of fouling in the airflow side.

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein:

FIG. 1B shows an isometric view of a frame of the heat exchanger unit according to embodiments of the disclosure;

FIG. 3 shows a side view of a monitored heat exchanger system that includes a monitoring module, a four-sided heat exchanger, and a heat generating device coupled together according to embodiments of the disclosure;

FIG. 4C shows a longitudinal cross-sectional view of an airflow sensor assembly according to embodiments of the disclosure;

FIG. 5A shows a view of an airflow sensor assembly connected with a rock guard according to embodiments of the disclosure;

FIG. 5B shows a view of an airflow sensor assembly connected with another rock guard according to embodiments of the disclosure;

FIG. 6 shows an alternative sensor assembly configuration according to embodiments of the disclosure.

DETAILED DESCRIPTION

Figure 1A:
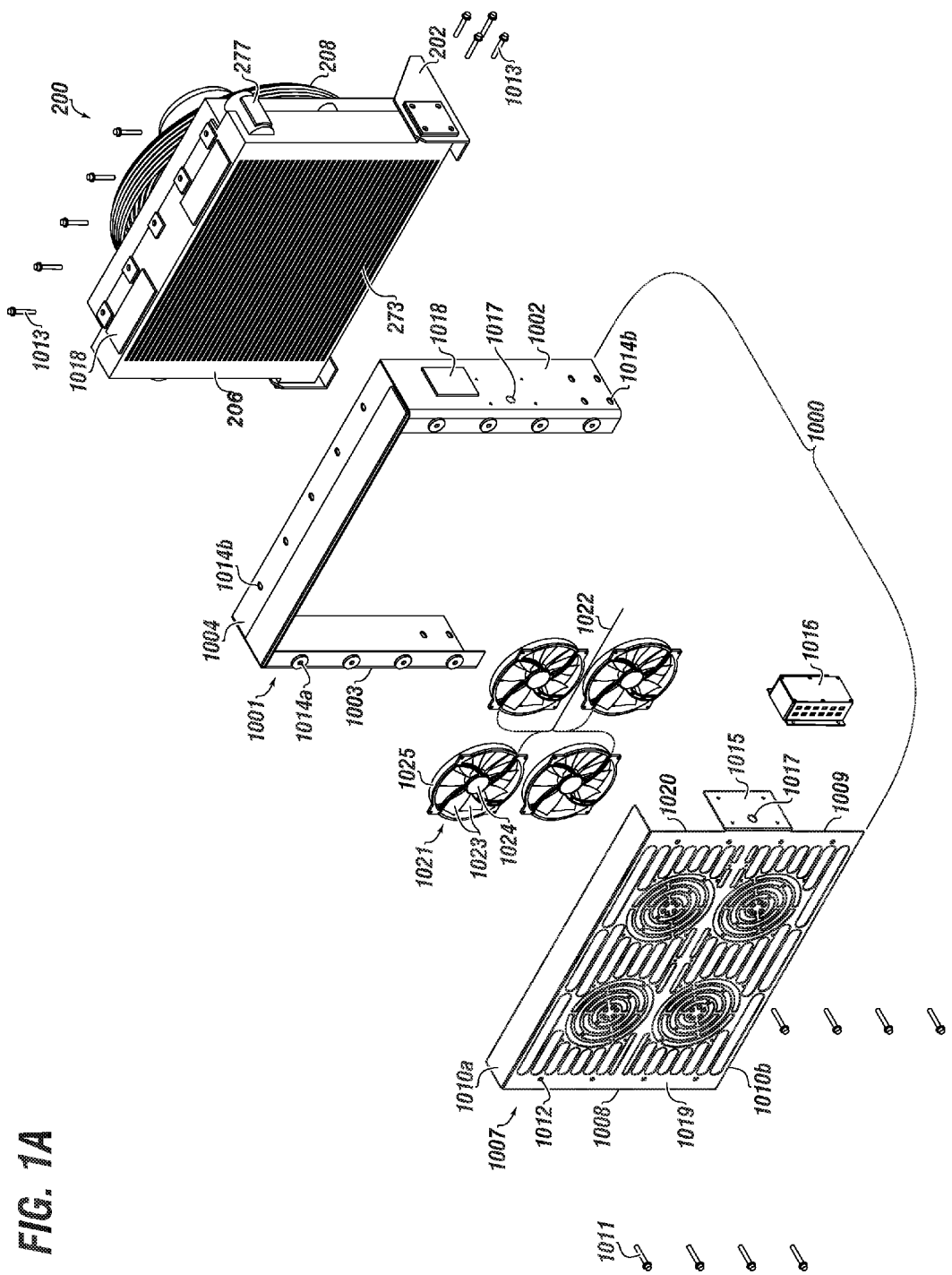
FIG. 1A shows an isometric view of a monitored heat exchanger system that includes a monitoring module, a heat exchanger unit, and a heat generation device operably coupled together according to embodiments of the disclosure.

Herein disclosed are novel apparatuses, systems, and methods that pertain to an improved heat exchanger and aspects related thereto, details of which are described herein.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," "right", "left", "down", etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, PTFE between threads, and the like. The make and manufacture of any particular component, subcomponent, etc., may be as would be apparent to one of skill in the art, such as molding, forming, press extrusion, machining, or additive manufacturing. Embodiments of the disclosure provide for one or more components to be new, used, and/or retrofitted to existing machines and systems.

Terms

The term "engine" as used herein can refer to a machine with moving parts that converts power into motion, such as rotary motion. The engine can be powered by a source, such as internal combustion.

The term "motor" as used herein can be analogous to engine. The motor can be powered by a source, such as electricity, pneumatic, or hydraulic.

The term "drive" (or drive shaft) as used herein can refer to a mechanism that controls or imparts rotation of a motor(s) or engine(s).

The term "pump" as used herein can refer to a mechanical device suitable to use an action such as suction or pressure to raise or move liquids, compress gases, and so forth. 'Pump' can further refer to or include all necessary subcomponents operable together, such as impeller (or vanes, etc.), housing, drive shaft, bearings, etc. Although not always the case, 'pump' can further include reference to a driver, such as an engine and drive shaft. Types of pumps include gas powered, hydraulic, pneumatic, and electrical.

The term "frac pump" as used herein can refer to a pump that is usable with a frac operation, including being able to provide high pressure injection of a slurry into a wellbore. The frac pump can be operable in connection with a motor or engine. In some instances, and for brevity, 'frac pump' can refer to the combination of a pump and a driver together.

The term "frac truck" as used herein can refer to a truck (or truck and trailer) useable to transport various equipment related to a frac operation, such as a frac pump and engine, and a radiator.

The term "frac operation" as used herein can refer to fractionation of a downhole well that has already been drilled. 'Frac operation' can also be referred to and interchangeable with the terms fractionation, hydrofracturing, hydrofracking, fracking, fracing, and frac. A frac operation can be land or water based.

The term "radiator" can also be referred to or interchangeable with the term 'heat exchanger' or 'heat exchanger panel'. The radiator can be a heat exchanger used to transfer thermal energy from one medium to another for the purpose of cooling and/or heating.

The term "cooler" as used herein can refer to a radiator made up of tubes or other structure surrounded by fins (or 'core') that can be configured to extract heat from a fluid moved through the cooler. The term can be interchangeable with 'heat exchanger panel' or comparable. Heat can also be exchanged to another fluid, such as air.

The term "cooling circuit" as used herein can refer to a cooler and respective components.

The term "core" as used herein can refer to part of a cooler, and can include multiple layers of fins or fin elements.

The term "heat exchanger unit" as used herein can refer to a device or configuration that uses one or more coolers along with other components, such as a fan, mounts, tubing, frame, and so on. The heat exchanger unit can be independent and standalone or can be directly mounted to a heat generating device. The heat exchanger unit can be operable to pull (draw) ambient air in through the coolers in order to cool one or more service fluids. The heated air is moved or blown out as a waste exhaust stream.

The term "heat generating device" (or sometimes 'HGD') as used herein can refer to an operable device, machine, etc. that emits or otherwise generates heat during its operation, such as an engine, motor, a genset, or a frac pump (including the pump and/or respective engine). The HGD can be for an industrial or a residential setting.

The term "genset" (or generator set) as used herein can refer to a 'diesel generator' or the combination of a diesel engine (or comparable) and an electric generator. The genset can convert mechanical energy to electrical energy.

The term "utility fluid" as used herein can refer to a fluid used in connection with the operation of a heat generating device, such as a lubricant or water. The utility fluid can be for heating, cooling, lubricating, or other type of utility. 'Utility fluid' can also be referred to and interchangeable with 'service fluid' or comparable.

The term "mounted" as used herein can refer to a connection between a respective component (or subcomponent) and another component (or another subcomponent), which can be fixed, movable, direct, indirect, and analogous to engaged, coupled, disposed, etc., and can be by screw, nut/bolt, weld, and so forth.

The term "shim" as used herein can refer to a thin piece of material used in a small gap between objects. The shim can help align parts, reduce wear, and absorb tolerances between proximate components. The shim can be a precision shim.

The term "bearing" as used herein can refer to a rotary-type ball bearing that can have an inner ring independently movingly connected with an outer ring, and balls therebetween.

The term "sensor" as used herein can refer to a device that detects or measures a physical property and may record, indicate, or otherwise respond to it. The output of a sensor can be an analog or digital signal.

The term "Hall effect sensor" as used herein can refer to a sensor with respective circuitry suitable to generate a digital signal or pulse, or work as a magnetic switch latch, based on a change in magnetic field. The sensor can include a device or element having an electric current running through it, and can further be associated with an amplifier and a trigger.

The term "airflow sensor" as used herein can refer to a sensor used to detect or otherwise be able to measure (directly or indirectly) airflow.

The term "airflow sensor assembly" as used herein can refer to a device with operable connectivity between various components and subcomponents, and being useable to detect or otherwise be able to measure (directly or indirectly) airflow.

The term "circuit board" (also 'printed' circuit board) as used herein can refer to a board that mechanically supports and electrically connects electronic components using conductive tracks, pads and other features. Components (e.g., capacitors, resistors, etc.) can be soldered onto the circuit board and connected via various conductivity paths.

The term "transceiver" (also transceiver IC) as used herein can refer to a device or circuit that contains a signal transmitter and a signal receiver which are both combined and share common circuitry. The transceiver can 'translate' data for communicating via protocol requirements.

The term "bus network" as used herein can refer to the connectivity between various components, directly or indirectly. The bus network can utilize communication protocol to transmit information via any kind of variation of a physical quantity. Protocols may be implemented by hardware, software, or a combination of both.

The term "microprocessor" as used herein can refer to a logic chip or a computer processor on a microchip. The microprocessor may have most or all central processing unit (CPU) functions.

The term "microcontroller" as used herein can refer to a CPU with additional function or structure, such as RAM, ROM, and or peripherals like I/O all embedded on a single chip.

The term "voltage regulator" as used herein can refer to a device or logic circuit that maintains a constant voltage level.

The term "computer readable medium" (CRM) as used herein can refer to any type of medium that can store programming for use by or in connection with an instruction execution system, apparatus, or device. The CRM may be, for example, a device, apparatus, or system based on electronic, magnetic, optical, electromagnetic, or semiconductor function. By way of further example, the CRM may include an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical).

The term "solid data storage" as used herein can refer to a CRM having an array of data, including one or more lookup tables (LUT).

The term "lookup table" (or LUT) as used herein can refer to a data array that may include predetermined or reference data useable for comparison. A LUT(s) can be stored in static program storage, including solid data storage.

The term "Wi-Fi module" as used herein can refer to a device or logic circuit that provides ability for a microcontroller to communicate data to a network, as well as update firmware and code inside the microcontroller.

The term "GSM module" as used herein can refer to a device or logic circuit that provides ability for a microcontroller to communicate data or signal to a Global System for Mobile communication (GSM). The microcontroller can thus initiate, for example, the sending of information in a SMS message.

The term "CAN-Bus module" as used herein can refer to a message-based protocol that allows a microcontroller to communicate with other devices, which can include industrial or large pieces of equipment associated with a respective microcontroller.

Embodiments herein pertain to a monitored heat exchanger system that may include a heat exchanger unit in operable engagement with a heat generating device, with an at least one service fluid being transferable therebetween. The HX unit may include a frame; and at least one cooler coupled with the frame, the at least one cooler having an airflow-in side and a service fluid-in side.

The system may include a monitoring module coupled to the heat exchanger unit. The monitoring module may include a panel (or cover panel); an at least one sensor coupled with the cover panel; an at least one controller housing coupled with the cover panel; and a microcontroller disposed within the controller housing and in operable communication with the at least one sensor.

The at least one sensor may include a rotating member configured to generate a system signal proportional to an amount of rotation of the rotating member. In aspects, the microcontroller may be provided with computer instructions, and may be otherwise operable, for processing the system signal.

The monitoring module may include a plurality of sensors. One or more of the plurality of sensors may be in operable communication with the microcontroller. In aspects, at least one of the plurality of sensors or the microcontroller may be powered at least partially, directly or indirectly, by rotation of the rotating member.

The at least one sensor may include a plurality of blades extending (such as generally radially) from the rotating member. The system signal may pertain to or be based on an amount of fouling associated with the airflow side of the at least one cooler.

The monitoring module may include one or more of a solid data storage, a Wi-Fi module, a GSM module, and a CAN-Bus module. Each may be disposed within the controller housing and may be in operable communication with the microcontroller. Accordingly, the the microcontroller may be provided with computer instructions for communicating with one or more of the solid data storage, the Wi-Fi module, the GSM module, and the CAN-Bus module.

The at least one service fluid comprises one of lube oil, hydraulic fluid, fuel, charge air, transmission fluid, jacket water, and engine cooler. The heat generation device may be a diesel engine. In aspects, the heat exchanger unit may have four respective sides (and thus cubical or rectangular prism shaped). Each side may have a respective cooler mounted to the frame.

The heat exchanger unit may include a vertical axis; a frame comprising a top region, a bottom region, and a plurality of side regions; a plurality of coolers, each of the plurality of coolers coupled with the frame proximate to a respective side region of the plurality of side regions. Each of the plurality of coolers may have an outer surface and an inner surface. There may be an airflow region within the heat exchanger unit.

The heat exchanger unit may include a first set of baffles disposed therein. One or more of the first set of baffles may be configured or otherwise oriented at a first angle to the vertical axis.

The heat exchanger unit may include a second set of baffles disposed therein, each baffle of the second set of baffles configured at a second angle to the vertical axis. The heat exchanger unit may include a third set of baffles, each baffle of the third set of baffles configured at a third angle to the vertical axis. In aspects, the heat exchanger unit may include a fourth set of panels.

The first set of baffles, the second set of baffles, and the third set of baffles may have about three to about five baffles. One or more baffle of the first set of baffles, the second set of baffles, and/or the third set of baffles may include a sound absorbing material.

One or more baffles may be generally isosceles trapezoidal in shape. On or more baffles may have mineral wool disposed therein. One or more baffles may be configured (positioned, mounted, oriented, etc.) at a respective angle in the range of about 30 to about 60 degrees.

The heat exchanger unit may include a fan mount bar; a shroud coupled to a top surface; an aeroring; and a fan mounted to the fan mount bar. The fan may have a motor and a one or more fan blades, including in the range of about 8 to about 12. The heat exchanger unit may have an exhaust outlet.

The heat exchanger unit may have a plurality of coolers configured to permit airflow to pass therethrough. In aspects, operation of a fan may result in airflow through each of the plurality of coolers, into the airflow region, and out of the outlet. The frame of the heat exchanger unit may include a plurality of horizontal members and vertical member configured together in a manner that results in a generally cube-shaped frame.

The heat exchanger unit of the system may include other configurations, such as a frame comprising a top region, a bottom region, and plurality of side regions; a plurality of coolers, each of the plurality of coolers coupled with the frame proximate to a respective side region, and each of the plurality of coolers comprising a core welded with a tank. Each core further may include a core end having a core end mass. Each tank further may include a tank end having a tank end mass. In aspects, each core end mass may be greater than each respective tank end mass.

The heat exchanger system may include the HX unit having a frame with a top region, a bottom region, and an at least one side region. There may be at least one cooler coupled with the frame proximate to the at least one side region. The cooler may have an outer surface and an inner surface.

The system may include the use of a mount assembly for coupling a cooler to the frame of the HX unit. The mount assembly may include an elongated fastening member; a rigid outer ring; a rigid inner ring; and a deformable ring disposed between the rigid outer ring and the inner outer ring.

At least one cooler may include a mounting slot. In aspects, the elongated fastening member may extend through the rigid inner ring and at least partially into the frame.

Other embodiments of the disclosure pertain to a monitored heat exchanger system that may include a heat exchanger unit in operable engagement (including fluid communication) with a heat generating device. There may be an at least one service fluid transferable therebetween. The heat exchanger unit may include a frame; and at least one cooler coupled with the frame, the at least one cooler having an airflow side and a service fluid side fluidly separated from each other.

The monitored system may include a monitoring module coupled to the heat exchanger unit. The monitoring module may include a cover panel; an at least one sensor coupled with the cover panel; at least one controller housing proximate with the cover panel; and a microcontroller mountingly disposed within the controller housing and in operable communication with the at least one sensor.

The at least one sensor may include a rotating member configured to generate a system signal proportional to an amount of rotation of the rotating member. The microcontroller may be provided with computer instructions for processing the system signal. In aspects, an amount of rotation of the rotating member may be dependent upon an amount of fouling in the airflow side.

The monitoring module may include a plurality of sensors. One or more of the plurality of sensors may be in operable communication with the microcontroller. In aspects, at least one of the plurality of sensors or the microcontroller may be powered at least partially, directly or indirectly, by rotation of the rotating member.

The monitoring module may include one or more of a solid data storage, a Wi-Fi module, a GSM module, and a CAN-Bus module. Any of which may be mountingly disposed within the controller housing and may be in operable communication with the microcontroller. Accordingly, the microcontroller may be provided with computer instructions for communicating and otherwise operating with with one or more of the solid data storage, the Wi-Fi module, the GSM module, and the CAN-Bus module.

The at least one service fluid may be one of lube oil, hydraulic fluid, fuel, charge air, transmission fluid, jacket water, and engine cooler. The heat generation device may be a diesel engine. The heat exchanger unit may have a plurality of sides, such as about three sides to about five sides. In aspects, there may be four sides. Any of the sides may have a respective cooler mounted to the frame proximate thereto. Any of the sides may have a respective monitoring module operably associated therewith.

The heat exchanger unit of the monitored system may include a frame having a top region, a bottom region, and plurality of side regions; a plurality of coolers, each of the plurality of coolers coupled with the frame proximate to a respective side region, and each of the plurality of coolers comprising a core welded with a tank; and a first set of baffles, each baffle of the first set of baffles configured at a first angle to an axis.

In aspects, one or more cores may have a core end having a core end mass. In aspects, one or more tanks may have a tank end having a tank end mass. In aspects, the core end mass may be greater than the tank end mass of a respective core.

The heat exchanger unit may include a second set of baffles, each baffle of the second set of baffles configured at a second angle to the axis. Any of the baffles may have a sound absorbing material therein. The first angle and/or the second angle may be in the range of about 30 degrees to about 60 degrees. The sound absorbing material may be mineral wool.

The heat exchanger unit of the system may include a frame comprising a top region, a bottom region, and one or more side regions. There may be one or more coolers coupled with the frame proximate to a respective side region. Any cooler may have a core welded with a tank. The unit may include a first set of baffles, any of which may be configured at a first angle to an axis. Any core may include a core end having a core end mass. Any tank may have a tank end having a tank end mass. For any respective core, the core end mass may be greater than each respective tank end mass.

The heat exchanger unit may include a mount assembly associated therewith. The mount assembly may be configured for coupling a respective cooler to the frame. The mount assembly may include an elongated fastening member; a rigid outer ring; a rigid inner ring; and a deformable ring disposed between the rigid outer ring and the inner outer ring. The respective cooler may include at least one mounting slot, whereby the elongated fastening member may extend through the rigid inner ring and at least partially into the frame.

The heat exchanger unit may include a vertical axis; an airflow region within the heat exchanger unit; and a first set of baffles, each of the first set of baffles configured at an angle to the vertical axis.

Any of the baffles may have a sound absorbing material, such as mineral well, disposed therein (or therewith). An orientation angle of the baffle within the heat exchanger unit may be in the range of about 30 to about 60 degrees.

The heat exchanger unit of the system may include a fan mount bar extending between one of the plurality of side regions and another of the plurality of side regions; and a fan mounted to the fan mount bar. The fan may include a motor and a plurality of fan blades in the range of about 8 to about 12. The fan may include a hydraulic motor. The motor may be powered by a pressurized hydraulic fluid pressurized to a range of about 2000 to about 6000 psi. The pressurized fluid may be cooled by the heat exchanger unit.

Any respective cooler may include a weld between the tank end and the core end that may be a v-groove weld.

The heat exchanger unit may include between about one set of baffles to about four sets of baffles, any of which may include the sound absorbing material, which may include mineral wool. Baffles of the sets may have various orientation angles, including in the range of about 30 degrees to about 60 degrees. Baffles of the sets may have various shapes, any of which may be generally isosceles trapezoidal in shape.

Embodiments of the disclosure pertain to a monitoring module for monitoring operation of a heat exchanger unit that may include a cover panel configured for direct or indirect coupling to the heat exchanger unit; one or more sensors coupled with the cover panel. Any of the one or more sensors may have a respective rotating member with a plurality of blades extending therefrom.

The module may include a logic circuit in operable communication with the plurality of sensors, and further comprising: a microcontroller and a data storage. The microcontroller may be configured with computer instructions for performing one or more of the tasks of: acquiring a set of data from at least one of the plurality of sensors; sampling the set of data over a predetermined period of time; computing an average and a standard deviation of the set of data; comparing the standard deviation with predetermined data; determining whether the set of data is acceptable within a defined parameter; determining whether a first lookup table comprising a set of lookup data has been completed, and creating the first lookup table using an averaging method if it has not; comparing the set of data to the set of lookup data; and providing an indication based on a result of the comparing the set of data to the set of lookup data step.

The microcontroller may be powered at least partially, directly or indirectly, by at least one of the plurality of sensors.

The indication may be communicated to an end user by way of at least one of: a text message, an email, an audio signal, a visual indicator, and combinations thereof.

The logic circuit may include the microcontroller in operable communication with one or more of: a Wi-Fi module, a GSM module, and a CAN-Bus module. Accordingly, the microcontroller may be provided with computer instructions for communicating with one or more of: the Wi-Fi module, the GSM module, and the CAN-Bus module.

Other embodiments of the disclosure pertain to a monitoring module that may include a cover panel mountingly associated with an airflow side of the heat exchanger unit; a plurality of sensors coupled with the cover panel, each of the sensors having a respective rotating member with a plurality of blades extending therefrom; a logic circuit in operable communication with the plurality of sensors. The logic circuit may include a a microcontroller configured with computer instructions for performing one or more of the tasks of: acquiring a set of data from at least one of the plurality of sensors; sampling the set of data over a predetermined period of time of less than 120 seconds; computing an average and a standard deviation of the set of data; comparing the standard deviation with predetermined data stored in a data storage; determining whether the set of data is acceptable within a defined parameter; determining whether a first lookup table comprising a set of lookup data has been completed, and creating the first lookup table using an averaging method if it has not; comparing the set of data to the set of lookup data; and providing an indication based on a result of the comparing the set of data to the set of lookup data step.

The logic circuit may include the microcontroller in operable communication with one or more of a Wi-Fi module, a GSM module, and a CAN-Bus module. Thus the microcontroller may have computer instructions programmed therein for communicating with one or more of the Wi-Fi module, the GSM module, and the CAN-Bus module.

The monitoring module may be operable to provide the indication as it pertains to an amount of fouling on the airflow side.

The microcontroller may be powered at least partially by at least one of the plurality of sensors.

A method for monitoring a heat exchanger unit coupling the heat exchanger unit with a heat generating device; associating a monitoring module with an airflow side of the heat exchanger unit. The monitoring module may include a cover panel configured for direct or indirect coupling to the heat exchanger unit; an at least one sensor coupled with the cover panel, the at least one sensor having a respective rotating member with a plurality of blades extending therefrom.

The logic circuit may be in operable communication with the at least one sensor. The microcontroller may have computer instructions for performing one more of the tasks of: acquiring a set of data from the at least one sensor; sampling the set of data over a predetermined period of time; computing an average and a standard deviation; comparing the standard deviation with predetermined data stored on a data storage; determining whether the set of data is acceptable within a defined parameter; determining whether a first lookup table comprising a set of lookup data has been completed, and creating the first lookup table using an averaging method if it has not; comparing the set of data to the set of lookup data; providing an indication based on a result of the comparing the set of data to the set of lookup data step; and performing an action based on the indication.

In aspects, the microcontroller is powered at least partially by at the at least one sensor. The indication is communicated to an end user by way of at least one of: a text message, an email, an audio signal, display, a visual indicator, and combinations thereof. The indication may be related to an amount of fouling present within the airflow side.

The monitoring module may include a plurality of sensors, any of which may be in operable communication with the microcontroller.

The method may include where the monitoring module may have one or more of a solid data storage, a Wi-Fi module, a GSM module, and a CAN-Bus module being disposed within the controller housing, one or more of which may be in operable communication with the microcontroller.

Thus the microcontroller may be programmed with respective computer instructions for communicating therewith, as applicable.

The method may include the use of at least one service fluid transferable between the heat exchanger unit and the heat generation device. The service fluid may be one of lube oil, hydraulic fluid, fuel, charge air, transmission fluid, jacket water, and engine cooler. There may be multiple service fluids transferable between the heat exchanger unit and the heat generation device.

In aspects, the generation device of the method may be a diesel engine. The heat exchanger unit may have four sides, each side having a respective cooler mounted to the frame.

The method may include the use of the heat exchanger unit having one or more of a vertical axis; a frame comprising a top region, a bottom region, and a plurality of side regions; a plurality of coolers, each of the plurality of coolers coupled with the frame proximate to a respective side region of the plurality of side regions, and each of the plurality of coolers having an outer surface and an inner surface; an airflow region within the heat exchanger unit; and a first set of baffles, each baffle of the first set of baffles configured at a first angle to the vertical axis.

The heat exchanger unit of the method may further have a second set of baffles, one or more of which may be configured at a second angle to the vertical axis. There may be a third set of baffles, one or more of which may be configured at a third angle to the vertical axis. There may be a fourth set of baffles. Any baffle of the fourth set of baffles may be configured at a fourth angle to the vertical axis. Any of the first, second, third, and fourth angles may be in the range of about 30 degrees to about 60 degrees. Any of the sets of baffles may have about four baffles. Any of the baffles may comprise a sound absorbing material associated therewith. Any of the baffles may be generally isosceles trapezoidal in shape.

The heat exchanger unit of the method may further include one or more of a fan mount bar; a shroud coupled to a top surface; an aeroring; and a fan mounted to the fan mount bar. The fan may include a motor and a plurality of fan blades in the range of about 8 to about 12. The unit may have an exhaust outlet.

The heat exchanger unit of the method may include one or more of a frame comprising a top region, a bottom region, and plurality of side regions; a plurality of coolers, each of the plurality of coolers coupled with the frame proximate to a respective side region, and each of the plurality of coolers comprising a core welded with a tank; and a first set of baffles, each baffle of the first set of baffles configured at a first angle to an axis.

Any cooler of the heat exchanger unit may have a core end mass. Any cooler of the heat exchanger unit may have a tank end mass. In aspects, the core end mass may be greater than the tank end mass of any of the respective coolers.

The method may include configuring the exchanger unit with a mount assembly. The mount assembly may include an elongated fastening member; a rigid outer ring; a rigid inner ring; a deformable ring disposed between the rigid outer ring and the inner outer ring. At least one of the plurality of coolers may include a mounting slot. In aspects, the elongated fastening member may extend through the rigid inner ring and at least partially into the frame.

The method may include the heat exchanger unit having an airflow region therein. The heat exchanger unit may include a fan mount bar extending between one of the plurality of side regions and another of the plurality of side regions. There may be a fan mounted to the fan mount bar, the fan further having a motor and a plurality of fan blades in the range of about 8 to about 12.

A respective cooler of the heat exchanger unit may have a weld between the first tank end and the core end that may be a v-groove weld.

Yet other embodiments of the disclosure pertain to a method for monitoring a heat exchanger unit that may include one or more steps of coupling the heat exchanger unit in fluid communication with a heat generating device; and associating a monitoring module with an airflow side of the heat exchanger unit.

The monitoring module may include one or more of a cover panel coupled to the heat exchanger unit; a plurality of sensors, each having a respective rotating member with a plurality of blades extending therefrom; and a logic circuit in operable communication with the plurality of sensors. The logic circuit may include a microcontroller that may be programmable and programmed for performing various tasks that may include any of: acquiring a set of data from at least one of the plurality of sensors; sampling the set of data over a predetermined period of time; determining whether the set of data is acceptable within a defined parameter; determining whether a first lookup table comprising a set of lookup data has been completed; comparing the set of data to the set of lookup data; providing an indication based on a result of the comparing the set of data to the set of lookup data step; based on the indication, performing a cleaning action on the heat exchanger unit.

The monitoring module may include one or more of a solid data storage, a Wi-Fi module, a GSM module, and a CAN-Bus module being disposed within the controller housing and in operable communication with the microcontroller. Accordingly the microcontroller may be provided with computer instructions for communicating with one or more of the solid data storage, the Wi-Fi module, the GSM module, and the CAN-Bus module.

The method may include an at least one service fluid transferable between the heat exchanger unit and the heat generation device. The service fluid may be one of lube oil, hydraulic fluid, fuel, charge air, transmission fluid, jacket water, and engine cooler.

In aspects, the heat generation device may be a diesel engine. The heat exchanger unit may include four sides, each side having a respective cooler mounted to the frame.

The heat exchanger unit of the method may include a vertical axis; a frame comprising a top region, a bottom region, and a plurality of side regions; a plurality of coolers, each of the plurality of coolers coupled with the frame proximate to a respective side region of the plurality of side regions, and each of the plurality of coolers having an outer surface and an inner surface; an airflow region within the heat exchanger unit; and a first set of baffles, each baffle of the first set of baffles configured at a first angle to the vertical axis.

The heat exchanger unit may further include a second set of baffles, each baffle of the second set of baffles configured at a second angle to the vertical axis. There may be a third set of baffles, each baffle of the third set of baffles configured at a third angle to the vertical axis. Any of the sets of baffles may have between about 1 to about 8 baffles. In aspects, any of the sets of baffles may have about four baffles. Any of the baffles may include a sound absorbing material.

The heat exchanger unit may include any of a fan mount bar; a shroud coupled to a top surface; an aerorig; and a fan mounted to the fan mount bar. The fan may have a motor and a plurality of fan blades in the range of about 8 to about 12. There may be an exhaust outlet.

Embodiments of the disclosure pertain to a business method (or a method of doing business) that may include one or more steps of: entering into a transaction with a first recipient; per terms of the transaction, providing a monitoring module for a heat exchanger unit; operably associating the monitoring module with the heat exchanger unit, the monitoring module being operable to monitor a fouling condition of the heat exchanger unit; receiving an indication from the monitoring module related to the fouling condition; and performing a cleaning action of the heat exchanger unit upon based on the indication.

In aspects, the transaction may have one or more terms related to equipment purchase, installation, software license, data sharing, cleaning service, and combinations thereof.

The business method may pertain to use of the monitoring module having a plurality of sensors mounted proximate to an airflow side of the heat exchanger unit, one or more of the sensors having a respective rotating member with a plurality of blades extending therefrom. There may be a logic circuit in operable communication with the plurality of sensors. The logic circuit may include a microcontroller and a data storage. The microcontroller may be configured with computer instructions for performing one or more tasks of: acquiring a set of data from at least one of the plurality of sensors; sampling the set of data over a predetermined period of time, and computing an average and a standard deviation; comparing the standard deviation with predetermined data; determining whether the set of data is acceptable within a defined parameter; determining whether a first lookup table comprising a set of lookup data has been completed, and creating the first lookup table using an averaging method if it has not; comparing the set of data to the set of lookup data; and providing the indication based on a result of the comparing the set of data to the set of lookup data step.

In aspects, the transaction may pertain to a one-time or ongoing fee associated with the use and operation of the monitoring module. The method may include providing data acquired by the monitoring module to the first recipient. The method may include providing an incentive to the recipient when the transaction pertains to at least two of: equipment purchase, installation, software license, data sharing, and cleaning service.

The method may include, per terms of the transaction, performing at least one of: coupling the heat exchanger unit in fluid communication with a heat generating device, and associating the monitoring module with an airflow side of the heat exchanger unit.

The monitoring module of the method may have one or more of a solid data storage, a Wi-Fi module, a GSM module, and a CAN-Bus module being disposed within the controller housing and in operable communication with the microcontroller. The microcontroller may be provided with computer instructions for communicating with one or more of the solid data storage, the Wi-Fi module, the GSM module, and the CAN-Bus module.

There may be an at least one service fluid if transferable between the heat exchanger unit and a heat generation device coupled in fluid communication therewith, and wherein the at least one service fluid comprises one of lube oil, hydraulic fluid, fuel, charge air, transmission fluid, jacket water, and engine cooler.

In aspects, the heat generation device may be a diesel engine. The heat exchanger unit may include four sides. One or more sides may have a respective cooler mounted to the frame.

The heat exchanger unit of the method may include a vertical axis; a frame comprising a top region, a bottom region, and a plurality of side regions; a plurality of coolers, each of the plurality of coolers coupled with the frame proximate to a respective side region of the plurality of side regions, and each of the plurality of coolers having an outer surface and an inner surface; an airflow region within the heat exchanger unit; and a first set of baffles, each baffle of the first set of baffles configured at a first angle to the vertical axis.

The heat exchanger unit may further include a second set of baffles, each baffle of the second set of baffles configured at a second angle to the vertical axis; and a third set of baffles, each baffle of the third set of baffles configured at a third angle to the vertical axis. The first set of baffles, the second set of baffles, and the third set of baffles may each have about four baffles. Any of the baffles may include a sound absorbing material, such as mineral wool.

The heat exchanger unit of the method may include a fan mount bar; a shroud coupled to a top surface; an aeroring; and a fan mounted to the fan mount bar. The fan may have a motor and a plurality of fan blades in the range of about 8 to about 12, and an exhaust outlet.

The heat exchanger unit may have at least one cooler having a core welded with a tank. The more may have a core end mass. The tank may have a tank end mass. In aspects, the core end mass may be greater than the tank end mass, of any respective core.

The heat exchanger unit may include the use of one or more mount assemblies. The mount assembly may be configured for coupling at least one cooler to the frame. The mount assembly may include: an elongated fastening member; a rigid outer ring; a rigid inner ring; a deformable ring disposed between the rigid outer ring and the inner outer ring. There may be at least one cooler having a mounting slot. The elongated fastening member may extend through the rigid inner ring and at least partially into the frame.

Embodiments herein pertain to a monitored heat exchanger system that may include a heat exchanger unit in operable engagement with a heat generating device, with an at least one service fluid being transferable therebetween, the heat exchanger unit further having a frame. There may be at least one cooler coupled with the frame, the at least one cooler having an airflow side and a service fluid side.

The system may include a controller housing coupled to the heat exchanger unit; a primary microcontroller disposed within the controller housing; and an at least one sensor assembly in operable communication with the primary microcontroller.

The at least one sensor assembly may include a mounting frame coupled to the heat exchanger unit; a support platform fixedly connected with the mounting frame, and may further have a platform hollow and a top platform surface; a shaft disposed or otherwise positioned in the platform hollow; a circuit board disposed on the top platform surface, and may be configured with an operable logic circuit that may include a secondary microcontroller, a Hall effect sensor, a transceiver, and may further have sufficient wiring, power, programmable instructions for communicating with (or providing the ability for communication to occur with) the primary microcontroller.

The sensor assembly may include an inner sensor housing disposed around the shaft. The inner sensor housing may be configured to extend out and around the circuit board and the support platform. There may be an at least one magnet coupled with the inner sensor housing. There may be a rotating member configured to generate, directly or indirectly, a system signal proportional to an amount of rotation of the rotating member. In aspects, the primary microcontroller is provided with computer instructions for processing the system signal.

The system may include a plurality of sensor assemblies, each of identical nature, and with each of the plurality of sensor assemblies having a respective operable logic circuit in operable communication with the primary microcontroller.

The controller housing may include one or more of a solid data storage, a Wi-Fi module, a GSM module, and a CAN-Bus module being disposed therein, and any of which may be in operable communication with the primary microcontroller. Thus, the primary microcontroller may be provided with computer instructions for communicating with one or more of the solid data storage, the Wi-Fi module, the GSM module, and the CAN-Bus module.

The heat exchanger unit of the system may include at least one baffle configured or otherwise oriented at an angle to an axis in the range of about 30 degrees to about 60 degrees. The at least one baffle may include a sound absorbing material.

The cooler may have a core welded with a tank. The core may have a core end having a core end mass that may be associated with a core end volume of material. The tank may have a tank end mass that may be associated with a first tank end volume of material. In aspects, the core end mass may be greater than each respective tank end mass.

The heat exchanger unit of the system may include a mount assembly for coupling the at least one cooler to the frame. The mount assembly may include an elongated fastening member; a rigid outer ring; a rigid inner ring; and a deformable ring disposed between the rigid outer ring and the inner outer ring. The at least one cooler may include a mounting slot. The elongated fastening member may extend through the rigid inner ring, through the mounting slot, and at least partially into at least one of the frame, an associated vertical member, an associated horizontal member, and combinations thereof.

Embodiments herein pertain to a monitored heat exchanger system that may include a heat exchanger unit in operable engagement with a heat generating device, with an at least one service fluid being transferable therebetween. The heat exchanger unit may further include: a frame; and an at least one cooler coupled with the frame, the at least one cooler having an airflow side and a service fluid side fluidly separated from each other. There may be a primary microcontroller operably associated with the heat exchanger unit. There may be an at least one sensor assembly in operable communication with the primary microcontroller.

The at least one sensor assembly may include a mounting frame coupled to the heat exchanger unit; a protected logic circuit comprising a secondary microcontroller and a Hall effect sensor. There may be sufficient wiring, power, programmable instructions and so forth whereby the circuit board logic circuit and the primary microcontroller may be in operable communication with each other.

The sensor assembly may include a rotating member rotatably disposed around a shaft, the rotating member being configured to generate or cause, directly or indirectly, a system signal proportional to an amount of rotation of the rotating member. There may be at least one magnet associated with the rotating member.

In aspects, the primary microcontroller may be provided with computer instructions for processing the system signal. The at least one service fluid may be one of lube oil, hydraulic fluid, fuel, charge air, transmission fluid, jacket water, and engine cooler. There may be multiple service fluids. The heat generation device may be a diesel engine. The sensor assembly may include: a support platform fixedly connected with the mounting frame, the support platform further having a platform hollow and a top platform surface. The shaft may be movably, such as rotatably, disposed in the platform hollow.

The primary microcontroller may be configured with computer instructions suitable for the execution or performing the tasks of: acquiring a set of data from the at least one sensor assembly; sampling the set of data over a predetermined period of time; computing an average and a standard deviation of the set of data; comparing the standard deviation with predetermined data; determining whether the set of data is acceptable within a defined parameter; determining whether a first lookup table comprising a set of lookup data has been completed, and creating the first lookup table using an averaging method if it has not; comparing the set of data to the set of lookup data; and providing an indication based on a result of the comparing the set of data to the set of lookup data step.

The heat exchanger unit may have at least one inner baffle. There may be a first set of baffles mounted at a first angle to a vertical axis. One or more of the baffles may include a sound absorbing material.

The at least one cooler may include a first tank end welded to a core end. A mass of a first tank end volume may be less than a core end mass of a core end volume. In aspects, there may be a weld between the first tank end and the core end. The weld may be a v-groove weld.

The heat exchanger unit may include a mount assembly for coupling the at least one cooler to the frame. The mount may include an elongated fastening member; a rigid outer ring; a rigid inner ring; and a deformable ring disposed between the rigid outer ring and the inner outer ring. The at least one cooler may include a mounting slot. The rigid outer ring, the rigid inner ring, and the deformable ring may be disposed within the mounting slot. The elongated fastening member may extend through the rigid inner ring and at least partially into the frame.

Embodiments of the disclosure pertain to a monitored heat exchanger system that may include a heat exchanger unit in operable engagement with a heat generating device. There may be an at least one service fluid being transferable therebetween. The heat exchanger unit may include a frame; and an at least one cooler coupled with the frame. The at least one cooler may have an airflow side and a service fluid side fluidly separated from each other.

There may be a controller housing associated with the heat exchanger unit. There may be a primary microcontroller disposed within the controller housing. There may be an at least one sensor assembly coupled with the heat exchanger unit. The primary microcontroller may be operable coupled with the at least one sensor assembly. The at least one sensor assembly may include a rotating member configured to generate, such as directly or indirectly, a system signal proportional to an amount of rotation of the rotating member. The primary microcontroller may be provided with computer instructions for processing the system signal. The amount of rotation of the rotating member may be dependent upon an amount of fouling in the airflow side.

The system may further include a plurality of sensor assemblies. Any or all of the plurality of sensors may be in operable communication with the primary microcontroller. There may be at least one of a solid data storage, a Wi-Fi module, a GSM module, and a CAN-Bus module disposed within the controller housing and in operable communication with the primary microcontroller. As such the primary microcontroller may be provided with computer instructions for communicating with one or more of the solid data storage, the Wi-Fi module, the GSM module, and the CAN-Bus module.

The at least one sensor assembly may include: a mounting frame coupled to the heat exchanger unit; and a support platform fixedly connected with the mounting frame. The support platform may further include a platform hollow and a top platform surface. There may be a shaft movably disposed in the platform hollow. There may be a circuit board disposed on the top platform surface. The circuit board may be configured with an operable logic circuit further comprising a secondary microcontroller and a Hall effect sensor. There may be sufficient wiring, power, programmable instructions to provide for communicating between the secondary microcontroller with the primary microcontroller.

There may be an inner sensor housing disposed around the shaft, the inner sensor housing configured to extend out and around the circuit board and the support platform. There may be an at least one magnet coupled with the inner sensor housing.

In aspects, the heat exchanger unit may include one or more coolers having a core welded with a tank. The core may have a core end with a core end mass. The tank may have a tank end with a tank end mass. The core end mass may be greater than the tank end mass.

The heat exchanger unit may include at least one baffle having a sound absorbing material associated therewith.

The heat exchanger unit may include an at least one mount assembly configured for coupling a respective cooler to the frame. The mount assembly may include an elongated fastening member; a rigid outer ring; a rigid inner ring; and a deformable ring disposed between the rigid outer ring and the inner outer ring.

The heat exchanger may include a tubular fan mount bar; a shroud; and an aeroring. There may be a fan mount coupled to the tubular fan mount bar. There may be a fan coupled to the fan mount. The fan may further include a motor. In aspects the motor may be a hydraulic motor that may be powered by a pressurized hydraulic fluid pressurized to a range of about 2000 to about 6000 psi.

Embodiments herein pertain to a monitoring module for monitoring operation of a heat exchanger unit that may include one or more sensor assemblies coupled therewith. At least one of the sensor assemblies may include a mounting frame configured for coupling to the heat exchanger unit. There may be a support platform connected with the mounting frame. The support platform may further include a platform hollow and a top platform surface. There may be a shaft rotatably disposed in the platform hollow.

The sensor assembly may include a circuit board, which may be disposed or otherwise positioned on the top platform surface. The circuit board may be configured with an operable logic circuit that may include a secondary microcontroller and a Hall effect sensor. The logic circuit may further include a transceiver. There may be sufficient wiring, power, programmable instructions for communicating (or for providing the ability to communicate) with a primary microcontroller.

The sensor assembly may include an inner sensor housing disposed around the shaft. The inner sensor housing may be configured to extend out and around the circuit board and the support platform. There may be a first magnet coupled with the inner sensor housing. There may be a second magnet coupled with the inner sensor housing. The assembly may include a rotating member configured to rotate. Upon rotation of the rotating member, at least the first magnet may disrupt a magnetic field of the Hall effect sensor. The magnetic disruption may result in the generation of a system signal. The system signal may be proportional to an amount of rotation of the rotating member, and/or the system signal may be proportional to an amount of fouling of the heat exchanger unit.

There may be a monitoring logic circuit in operable communication with at least one of the plurality of sensors. The monitoring logic circuit may include a primary microcontroller and a data storage. The primary microcontroller may be configured with computer instructions for performing one or more tasks of: acquiring a set of data from at least one of the plurality of sensors; sampling the set of data over a predetermined period of time; computing an average and a standard deviation of the set of data; comparing the standard deviation with predetermined data; determining whether the set of data is acceptable within a defined parameter; determining whether a first lookup table comprising a set of lookup data has been completed, and creating the first lookup table using an averaging method if it has not; comparing the set of data to the set of lookup data; and providing an indication based on a result of the comparing the set of data to the set of lookup data step.

In aspects, the indication may be communicated to an end user by way of at least one of: a text message, an email, an audio signal, a visual indicator, and combinations thereof.

The monitoring logic circuit may further include the primary microcontroller in operable communication with one or more of a Wi-Fi module, a GSM module, and a CAN-Bus module. The primary microcontroller may be provided with computer instructions for communicating with any of the Wi-Fi module, the GSM module, and the CAN-Bus module.

Yet other embodiments of the disclosure pertain to a method for monitoring a heat exchanger unit that may include one or more steps of: coupling the heat exchanger unit with a heat generating device; and associating a monitoring module with an airflow side of the heat exchanger unit. The monitoring module may include a sensor assembly that further includes a mounting frame; a support platform coupled with the mounting frame, the support platform further comprising a platform hollow and a top platform surface; a shaft rotatably disposed in the platform hollow; a circuit board disposed proximate to the top platform surface, the circuit board being configured with a secondary microcontroller, a Hall effect sensor, a transceiver, and sufficient wiring, power, programmable instructions for communicating (or providing the ability for communicating with a primary microcontroller; an inner sensor housing disposed around the shaft, the inner sensor housing configured to extend out and around the circuit board and the support platform; an at least one magnet coupled with the inner sensor housing; and a rotating member configured to rotate. Upon rotation of the rotating member, the at least one magnet may be configured in manner whereby a magnetic field of the Hall effect sensor is effected or otherwise disrupted, thereby generating (or causing to be generated) a system signal. The system signal may be proportional to one of an amount of rotation of the rotating member, an amount of fouling of the heat exchanger unit, or both.

In aspects, the primary microcontroller may be configured with computer instructions for executed of or performing the tasks of at least one or more of: acquiring a set of data from the sensor assembly; comparing the set of data to a set of lookup data; and providing an indication based on a result of the comparing the set of data to the set of lookup data step. The method may further include the step of performing an action based on the indication.

The method may pertain to the heat exchanger unit having a vertical axis; a frame comprising a top region, a bottom region, and a plurality of side regions; a plurality of coolers, each of the plurality of coolers coupled with the frame proximate to a respective side region of the plurality of side regions, and each of the plurality of coolers having an outer surface and an inner surface; an airflow region within the heat exchanger unit; and a first set of baffles, each baffle of the first set of baffles configured at a first angle to the vertical axis. Any of the baffles may include a sound absorbing material. The sound absorbing material may be mineral wool. The first angle may be in the range of about 30 degrees to about 60 degrees.

The method may pertain to the heat exchanger unit having one or more of a fan mount bar; a shroud; an aeroring; and a fan mounted to the fan mount bar. The fan may have a plurality of fan blades in the range of about 8 to about 12.

The method may pertain to the heat exchanger unit having a frame with an at least one cooler coupled therewith. The at least one cooler further may include a core welded with a tank. The core may include a core end having a core end mass. The tank may include a tank end having a tank end mass. The core end mass may be greater than the tank end mass.

The method may pertain to the heat exchanger unit having at least one a mount assembly configured for coupling the at least one cooler to the frame. The mount assembly may include an elongated fastening member; a rigid outer ring; a rigid inner ring; and a deformable ring disposed between the rigid outer ring and the inner outer ring. The at least one cooler may include a mounting slot. The elongated fastening member may extend through the rigid inner ring and at least partially into the frame.

Yet other embodiments of the disclosure pertain to a method for monitoring a heat exchanger unit that may include one or more steps of coupling the heat exchanger unit in fluid communication with a heat generating device; associating a monitoring module with an airflow side of the heat exchanger unit; and based on an indication, performing a cleaning action on the heat exchanger unit.

In aspects, monitoring module may include one or more sensor assemblies. Any sensor assembly may have a respective rotating member configured with a plurality of blades extending therefrom. The rotating member may be operably associated with a respective secondary microcontroller.

The module may include a primary microcontroller in operable communication with any respective secondary microcontroller. The primary microcontroller may be operable with computer instructions for performing any of the tasks of: acquiring a set of data from at least one of the plurality of sensors; sampling the set of data over a predetermined period of time; determining whether the set of data is acceptable within a defined parameter; determining whether a first lookup table comprising a set of lookup data has been completed; comparing the set of data to the set of lookup data; and providing an indication based on a result of the comparing the set of data to the set of lookup data step; and The monitoring module may include one or more of a solid data storage, a Wi-Fi module, a GSM module, and a CAN-Bus module, any of which may be in operable communication with the primary microcontroller. The primary microcontroller may be provided with computer instructions for communicating with one or more of the solid data storage, the Wi-Fi module, the GSM module, and the CAN-Bus module.

Still other embodiments pertain to a method of doing business that may in include the steps of entering into a transaction with a first recipient; per terms of the transaction, providing a monitoring module for a heat exchanger unit, operably associating the monitoring module with the heat exchanger unit, the monitoring module being operable to monitor a fouling condition of the heat exchanger unit, the monitoring module including a sensor assembly in operable communication with a primary microcontroller; receiving an indication from the monitoring module related to the fouling condition; and performing a cleaning action of the heat exchanger unit upon based on the indication. In aspects, the transaction may include terms pertaining to at least one of: equipment purchase, installation, software license, data sharing, cleaning service, and combinations thereof.

The sensor assembly may be coupled with the heat exchanger unit. The sensor assembly may include a rotating member configured with one or more blades extending therefrom. There may be a monitoring logic circuit that includes the primary microcontroller, and may further include a data storage. The primary microcontroller may be configured with computer instructions for performing one or more tasks of: acquiring a set of data from the at least one sensor; sampling the set of data over a predetermined period of time, and computing an average and a standard deviation; comparing the standard deviation with predetermined data; determining whether the set of data is acceptable within a defined parameter; determining whether a first lookup table comprising a set of lookup data has been completed, and creating the first lookup table using an averaging method if it has not; comparing the set of data to the set of lookup data; and providing the indication based on a result of the comparing the set of data to the set of lookup data step.

The transaction may include a one-time or ongoing fee associated with the use and operation of the monitoring module. The method may further include providing data acquired to the first recipient.

Embodiments of the disclosure pertain to an airflow sensor assembly that may include: a casing comprising a casing outer surface, a casing inner surface, a casing topside, and a casing bottom side, and a casing opening; a mounting frame disposed proximate to the casing bottom side, the mounting frame further comprising a central segment; a guard disposed proximate to the casing topside; a support platform coupled with the central segment, and further comprising: a platform hollow; and a top platform surface; a shaft centrally positioned within the casing opening and further disposed in the platform hollow; a plurality of assembly screws disposed through the casing, the mounting frame, and the guard; a plurality of fasteners configured for connecting with the plurality of assembly screws; a first bearing disposed around the shaft and proximate the support platform; a second bearing disposed around the shaft and on top of the first bearing, and proximate the support platform; a circuit board positioned onto the top platform surface, the circuit board being configured with an operable logic circuit further comprising a secondary microcontroller, a Hall effect sensor, and a transceiver; a first lock nut threadingly engaged around the shaft in an amount sufficient to engage the second bearing; an inner sensor housing disposed around the shaft, the inner sensor housing configured to extend out and around the circuit board and the support platform; an at least one magnet coupled with the inner sensor housing; a rotating member comprising a plurality of blades, and the rotating member being disposed around the shaft; a second lock nut threadingly engaged around the shaft sufficiently enough to engage the rotating member.

In operation, airflow may impact the plurality of blades thereby causing the rotating member to rotate, and resultantly causing the shaft to rotate. The shaft may cause to rotate, directly or indirectly, the at least one magnet periodically into proximity with the Hall effect sensor. A digital signal may be generated based on a change in a magnetic field of the Hall effect sensor caused by the at least one magnet passing in proximity thereby.

Embodiments herein pertain to an airflow sensor assembly for a monitored heat exchanger system that may include a mounting frame configured for coupling the assembly with the heat exchanger unit, the mounting frame further having a central segment. There may be a support platform coupled with the central segment. The support platform may include a platform hollow; and a top platform surface.

The sensor assembly may include a shaft disposed in the platform hollow. There may be a first bearing disposed around the shaft and proximate the support platform. There may be a circuit board positioned onto the top platform surface. The circuit board may be configured with an operable sensor logic circuit further that may include a secondary microcontroller and a Hall effect sensor. The assembly may include a rotating member having one or more blades. The rotating member may be disposed around the shaft.

The sensor assembly may include a lock nut threadingly engaged around the shaft sufficiently enough to engage a rotating member mounting ring.

In operation, as airflow impacts the one or more blades, the rotating member may rotate in response thereto. This may resultantly cause the shaft to rotate. As the shaft rotates, the at least one magnet may periodically come into proximity with the Hall effect sensor. A digital signal may be generated based on a change in a magnetic field of the Hall effect sensor caused by the at least one magnet.

Still other embodiments of the disclosure pertain to a sensor assembly comprising having a mounting frame further comprising a central segment; a support platform coupled with the central segment, and further comprising: a platform hollow; and a top platform surface; a shaft disposed in the platform hollow; a first bearing disposed around the shaft, and also disposed at least partially in the platform hollow.

The sensor assembly may include a circuit board positioned onto the top platform surface. The circuit board may be configured with a secondary microcontroller and a Hall effect sensor. There may be a first lock nut threadingly engaged around the shaft sufficiently enough to exert a holding pressure against the first bearing. There may be an inner sensor housing disposed around the shaft, the inner sensor housing configured to extend out and around the circuit board and the support platform. There may be a rotating member comprising a plurality of blades and a rotating member mounting ring, the rotating member being disposed around the shaft and on top of the inner sensor housing. There may be a second lock nut threadingly engaged around the shaft sufficiently enough to engage the rotating member mounting ring.

The sensor assembly may include a casing further having a casing outer surface, a casing inner surface, a casing topside, and a casing bottom side, and a casing opening. There may be a guard disposed proximate to the casing topside. There may be a plurality of assembly screws disposed through the casing, the mounting frame, and the guard. There may be a plurality of fasteners configured for connecting with the plurality of assembly screws. There may be a second bearing disposed around the shaft and on top of the first bearing.

The sensor assembly may include a shim disposed around the shaft and between the first bearing and the second bearing. The shim may be a precision shim. There may be support plate disposed on top of the second bearing. The support plate may be tri-wing shaped. There may be an at least one binding screw mated with a respective binding post coupled together, whereby the support plate, the circuit board, the support platform, and the central segment may be resultantly coupled together.

Yet other embodiments of the disclosure pertain to a sensor assembly that may include a mounting frame; and a cylindrical support platform coupled with the mounting frame. The support platform may include a platform hollow; and a top platform surface. The assembly may include a circuit board positioned or otherwise mounted onto the top platform surface. The circuit board may be configured with a secondary microcontroller and a Hall effect sensor. There may be an inner sensor housing configured to extend out and around the circuit board and the support platform. There may be a first magnet coupled to an underside of the inner sensor housing. There may be a rotating member configured with a plurality of blades and a rotating member mounting ring. The rotating member may be proximately disposed on top of the inner sensor housing.

The sensor assembly may include a shaft disposed in the platform hollow. There may be a first bearing disposed around the shaft, and also disposed at least partially in the platform hollow. There may be a first lock nut threadingly engaged around the shaft sufficiently enough to exert a holding pressure against the first bearing. There may be a second lock nut threadingly engaged around the shaft sufficiently enough to engage the rotating member mounting ring. The rotating member mounting ring may be disposed around the shaft.

In operation, airflow may impact the plurality of blades thereby causing the rotating member to rotate. This may resultantly cause the shaft to rotate. As the shaft rotates the at least one magnet may periodically come into proximity with the Hall effect sensor. A digital signal may be generated based on a change in a disruption of magnetic field of the Hall effect sensor by the at least one magnet as it passes thereby.

The sensor assembly may include a second magnet coupled to the underside of the inner sensor housing. The first magnet may be oriented in a N/S pole orientation, and the second magnet may be oriented in a S/N pole orientation, or vice versa. In aspects, a first digital signal may be generated based on a change in a magnetic field of the Hall effect sensor caused by the first magnet. A second digital signal may be generated based on a change in a magnetic field of the Hall effect sensor caused by the second magnet.

Referring now to FIGS. 1A and 1B together, an isometric view of a monitored heat exchanger system that includes a monitoring module, a heat exchanger unit, and a heat generation device operably coupled together, and an isometric component breakout of a monitoring module associated with a heat exchanger unit, respectively, in accordance with embodiments disclosed herein, are shown. Embodiments herein apply to a heat exchanger unit that may be an inclusive assembly of a number of components, subcomponents, which may be further associated with operable systems, subsystems, assemblies, modules, and so forth that may overall be referred to as a system, such as heat exchanger monitoring system 201 (or monitored heat exchanger system).

The heat exchanger unit (or HX unit) 200 may include a solid integral frame (or skeletal frame) or may be a frame 202 that includes a number of elements arranged and coupled together. The simplified diagram of FIG. 2B illustrates the HX unit 200 coupled with a heat generation device 203. As can be seen a hot service fluid $F_{hot}$ may circulate from the HGD 203 to the HX unit, be cooled via core 206 (also sometimes recognizes as a cooler or radiator, or part thereof), and recirculate as a cooled service fluid $F_{cool}$ back to the HGD 203. Other equipment including other piping, valves, nozzles, pumps, tanks, etc. need not be shown, as one of skill in the art would have an understanding of coupling the HX unit 200 with the HGD 203 for operable transfer of one or more service fluids therefrom.

As shown system 201 may include the use of a monitoring module 1000. The monitoring module 1000 may be usable for monitoring one or more conditions, properties, characteristics, etc. associated with the operation of the HX unit 200. As an example, the monitoring module 1000 may be configured and used for measuring fouling associated with the core 206.

The module 1000 may be a modular assembly having various components and subcomponents associated and operable together, and like that described herein. The module 1000 may be sized and optimized accordingly for operable coupling with any type of radiator, including that associated with the HX unit 200. One of skill in the art would appreciate the monitoring module 1000 could be retrofitted to equipment already used in the field. Just the same the monitoring module 1000 could come associated and operably engaged with newly fabricated equipment. In aspects, a single HX unit 200 may have multiple monitoring modules 1000 associated therewith.

The module 1000 may be coupled to the frame 202 on a respective side of the HX unit 200 (including in place of a rock grate [not shown]). As shown, the module 1000 may include a mounting frame 1001. The mounting frame 1001 may be an integral piece having a first mounting frame side 1002, a second mounting frame side 1003, a mounting frame top 1004, and a mounting frame bottom (not shown here). The mounting frame may have a cover panel or guard 1007, which may be integral or coupled therewith. Analogous to the mounting frame 1001, the cover panel 1007 may have a first cover panel side 1008, a second cover panel side 1009, a cover panel top 1010a, and a cover panel bottom 1010b. Although quadrilateral in the general sense, it is within the scope of the disclosure that the mounting frame 1001 and/or the cover panel 1007 may have different shapes, including as might be necessary to be mounted with a different shape HX unit or radiator core.

As shown in FIG. 1A, the cover panel 1007 may have a plurality of cover panel apertures 1012 configured to coincide with a respective plurality of mounting frame apertures 1014a. Likewise the mounting frame 1001 may have a plurality of other mounting frame apertures 1014b configured to coincide with a respective plurality of apertures 282 of the frame 202.

One of skill would appreciate the mounting frame 1001 may be connected to the frame 202 via insertion of a plurality of connectors (fasteners, etc.) 1013 through apertures 1014b and 282, which may be screws, nut/bolt, quick disconnect, etc. Similarly, the cover panel may be connected to the mounting frame 1001 via insertion of a plurality of cover connectors 1011 through apertures 1012 and 1014*a*. The use of a separable mounting frame 1001 and cover panel 1007 allows for simple connect and disconnect from each other, which may make it easier for tasks such as maintenance or cleaning. In this respect the panel 1007 may be easily attachable and removable from the HX unit 200.

There may be a dampener(s) 1018 disposed between various components. For example, there may be one or more dampeners 1018 disposed between the frame 202 and the mounting frame 1001. Analogously, there may be one or more dampeners 1018 disposed between the cover panel 1007 and the mounting frame 1001. The dampener(s) 1018 may be suitable for reducing vibration stemming from operation of the heat exchanger unit 200 that may otherwise be induced into or received by the monitoring module 1000. The dampener 1018 may be one or more layers of a rubbery material, which may have one or more sides with an adhesive thereon.

The cover panel 1007 may have a front side 1019 and a back side 1020. From a reference standpoint the front side 1019 may be that which tends to face outward or away from the HX unit 200. Or where the cover panel 1007 may be considered exposed or external to the surrounding environment. The back side 1020 of the cover panel 1007 may be associated with one or more sensors 1021. The monitoring module 1000 may have a number of different types of sensors associated therewith, including pressure, temperature, noise, etc. Sensor 1021 may be referred to as an airflow sensor, in that the operation of sensor 1021 may help measure, determine, or otherwise sense airflow 216 moving into (or out of) the HX unit 200. In aspects, there may be about 1 to about 25 sensors 1021 associated with module 1000. However, the number of sensors 1021 is not meant to be limited, and may change depending on desired monitoring requirements for a given type of heat exchanger. Moreover, other sensor configurations are possible, such as sensor assembly 2000 described herein.

The sensor 1021 may be mounted to the cover panel 1007, and operated in a manner to sense airflow into the HX unit 200 as a result of suction. However, the sensor 1021 may just as well be mounted and operated in a manner to sense airflow out of the HX unit 200 (as a result of blowing). The sensor 2021 may be operated and setup to detect airflow through the core 206 during a clean, unfouled state, which may then be used as a baseline. As the HX unit 200 fouls, airflow through the core 206 may be effected, and the electrical signal generated by the sensor 1021 will have a measurable, detectable change in signal strength.

In some embodiments, the configuration (including its size, type placement, etc.) and operation of the sensor 1021 is believed of significance. For example, the sensor 1021 may need to be robust and durable, yet not of any (or as minimal as possible) effect on the operation of the HX unit 200. For example, a sensor that has an orifice may be just as prone to fouling and plugging, and ultimately failure and inability to measure airflow. Other sensors that are large or bulky may be cost prohibitive and/or attribute to unacceptable pressure drop attributable to the monitoring module.

As shown the sensor 1021 may have a rotating member 1024 (rotatable around an axis) with a plurality of blade members 1023 extending radially therefrom. The blade members 1023 may be configured to induce movement of the rotating member 1024 (rotatable about an axis) much in the same way the blades of a windmill function. That is, upon movement of air thereby, at least a minor amount of force (the amount of force being dependent upon the amount of movement of air) will be felt by the blade members 1023, and as a result of being connected to the rotating member 1024, induce rotation of the member 1024.

The rotating member 1024 may be associated with one or more bearings, whereby the rotating member 1024 may be freely movable with respect to a sensor housing or chassis 1025. In aspects, the rotating member 1022 may have a shaft or rotor, and the housing 1025 may be configurable as a (pseudo) stator. The sensor 1021 may have various circuitry and hardware associated therewith, whereby rotation of the shaft may induce or generate an electric current (e.g., via inductive properties attributable to a rotor/stator configuration).

The sensor 1021 may thus be configured to generate an electric current (or in the analogous sense, a voltage) proportional to an amount of rotation. The current, or really, a signal, may then be communicated to a microcontroller (1006, FIG. 1C), which may be part of a logic circuit of the monitoring module 1000. To be sure, sensor 1021 in other embodiments may be able to communicate other forms of sensed information, such as, for example, rpm related to the rotating member.

Figure 1C:
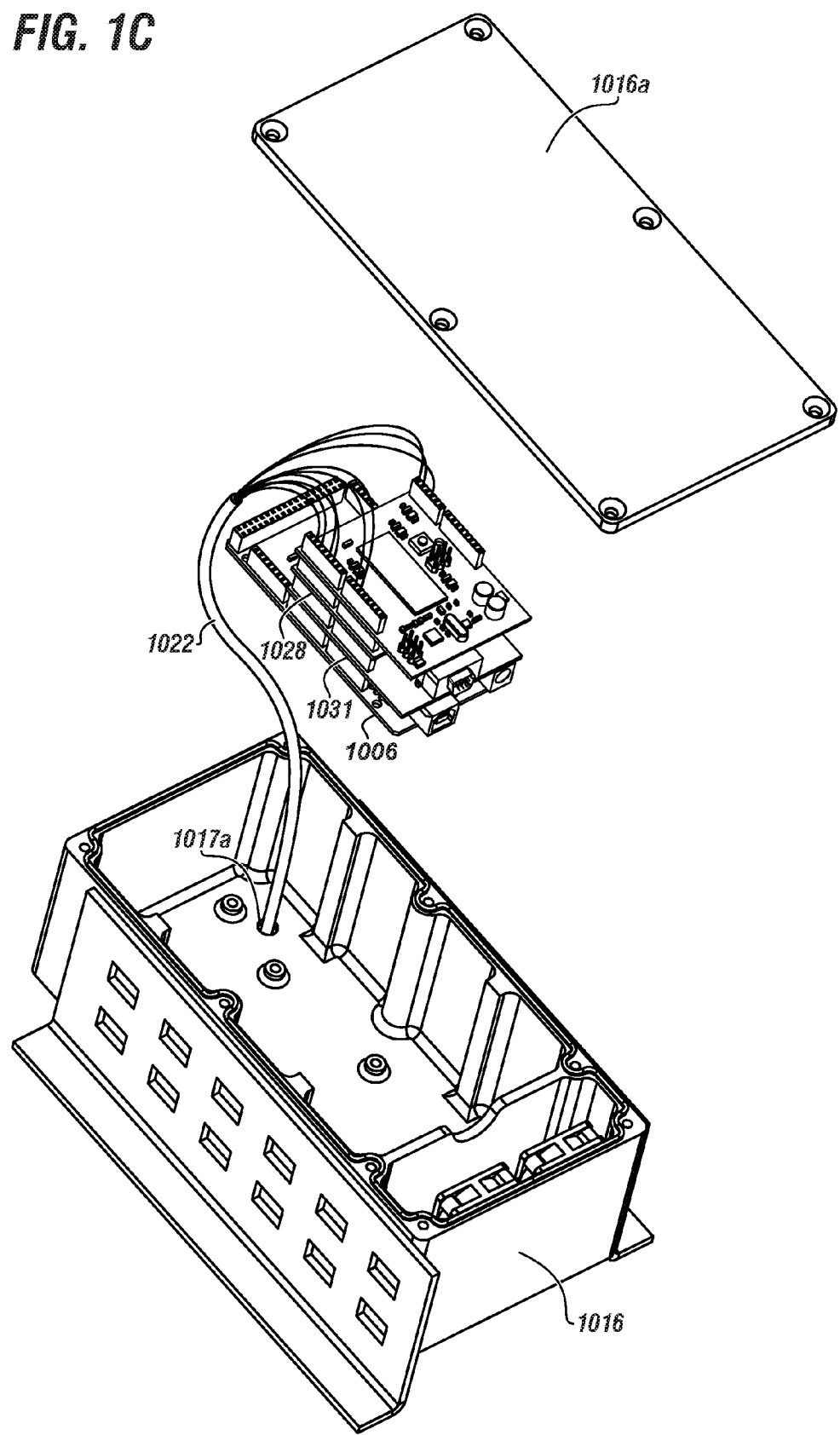
FIG. 1C shows a component breakout view of a controller housing usable with a monitoring module, and having various internal components according to embodiments of the disclosure.

Referring briefly to FIG. 1C, a component breakout view of a controller housing usable with a monitoring module, and having various internal components, according to embodiments of the disclosure, is shown. Equipment, such as hardware and software, pertaining to the logic circuit may be operably arranged within a controller housing 1016 (which may have a controller housing top 1016*a*).

The controller housing 1016 may be weatherproof and dustproof, and this may have an ability to protect internals from undesired environmental and harsh weather conditions. The housing 1016 may be mountable to housing mount 1015. The housing 1016 and housing mount 1015 may have corresponding openings 1017*a*, 1017*b*, respectively, for accommodating the passing of wires and other circuitry therethrough. The openings 1017 *a,b* may be sealed, such as with silicone.

The controller housing 1016 may be configured with suitable components and hardware for that accommodate or provide functionality of the monitoring system 201. Such components may include, for example, the microcontroller 1006 (in operable communication and connected with sensors 1021 via wiring, circuitry, and so forth), a regulator (such as a voltage regulator) (not shown here), a power supply or battery (or battery cell) 1027*a*, a charger (e.g., battery charger) (not shown here), solid data storage 1028, a Wi-Fi module 1029, a GSM module 1030, a CAN-Bus module 1031, and various indicators, such as audio or visual (e.g., RGB LEDs) 1032.

Referring now to FIGS. 1A, 1B, and 1C, together, the microcontroller 1006 may be readily useable and compatible with various hardware, including switches, LED's, and sensors. The microcontroller 1006 may include HDMI output to a screen such as a TV or a monitor, as well as wirelessly communicating to smart phones or computers via Wifi or Bluetooth.

A signal from the microcontroller 1006 may generate a signal communicable as a message or other form of warning, including by way of one or more of audio, video/visual (e.g., Green, Yellow, Red LEDs), email, SMS/text, CAN Bus, such as J1939. Thus, the module 1000 may include a LED response interface. In embodiments, LED lights may be configured to provide varied warnings based on monitoring and detection. For example, and with respect to certain percentage of fouling, the LED lights may flash green (0-25% fouled), yellow (25-75% fouled), or red (75-100% fouled). In a similar manner, a warning may be transmitted (e.g., text/SMS, push notification, email, J1939, etc.) based on a percentage of fouling.

Software herein may be able to read values from the SD card and create a look-up table.

Figure 2A:
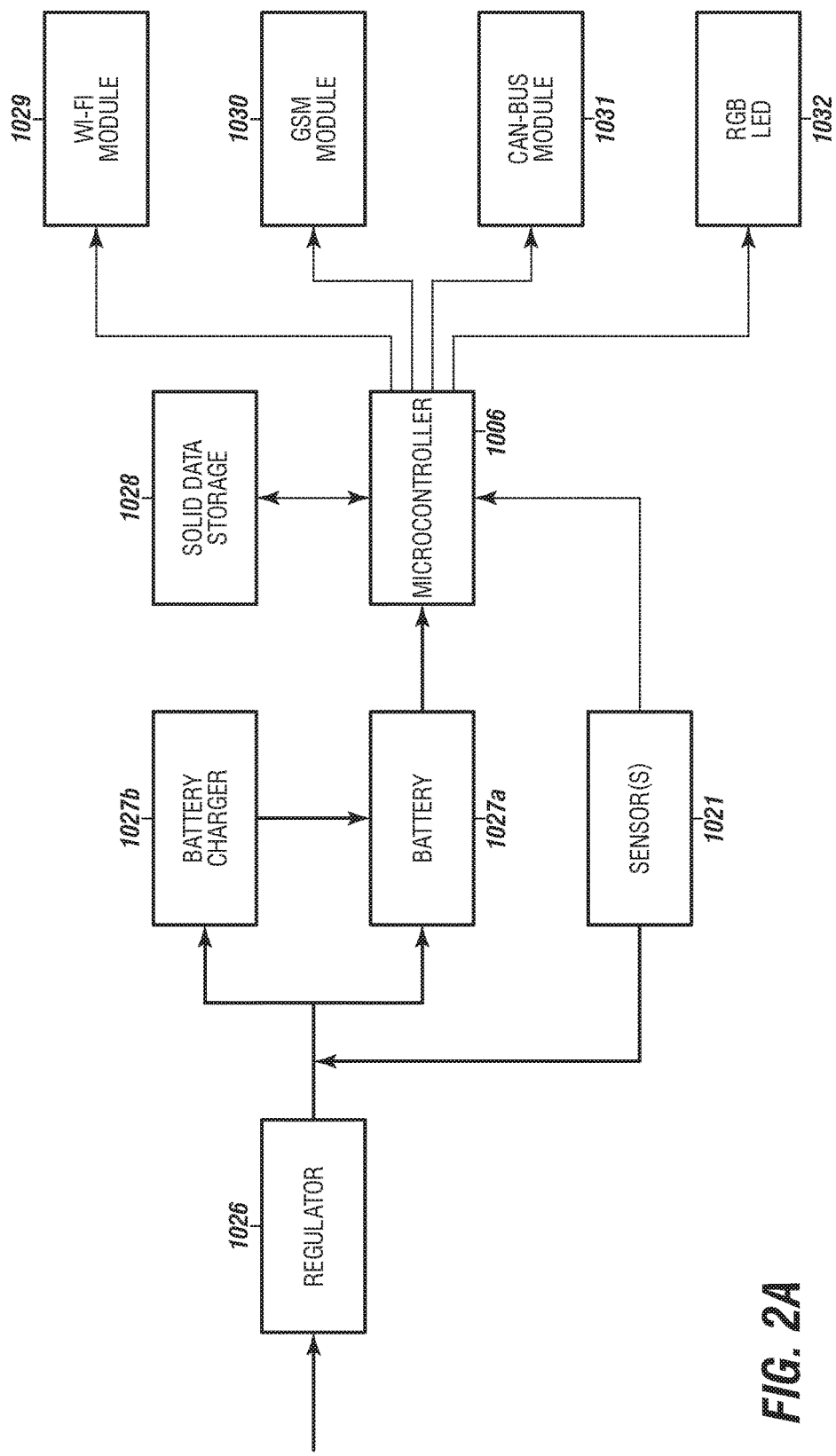
FIG. 2A shows a logic circuit process flow diagram according to embodiments of the disclosure.
Figure 2B:
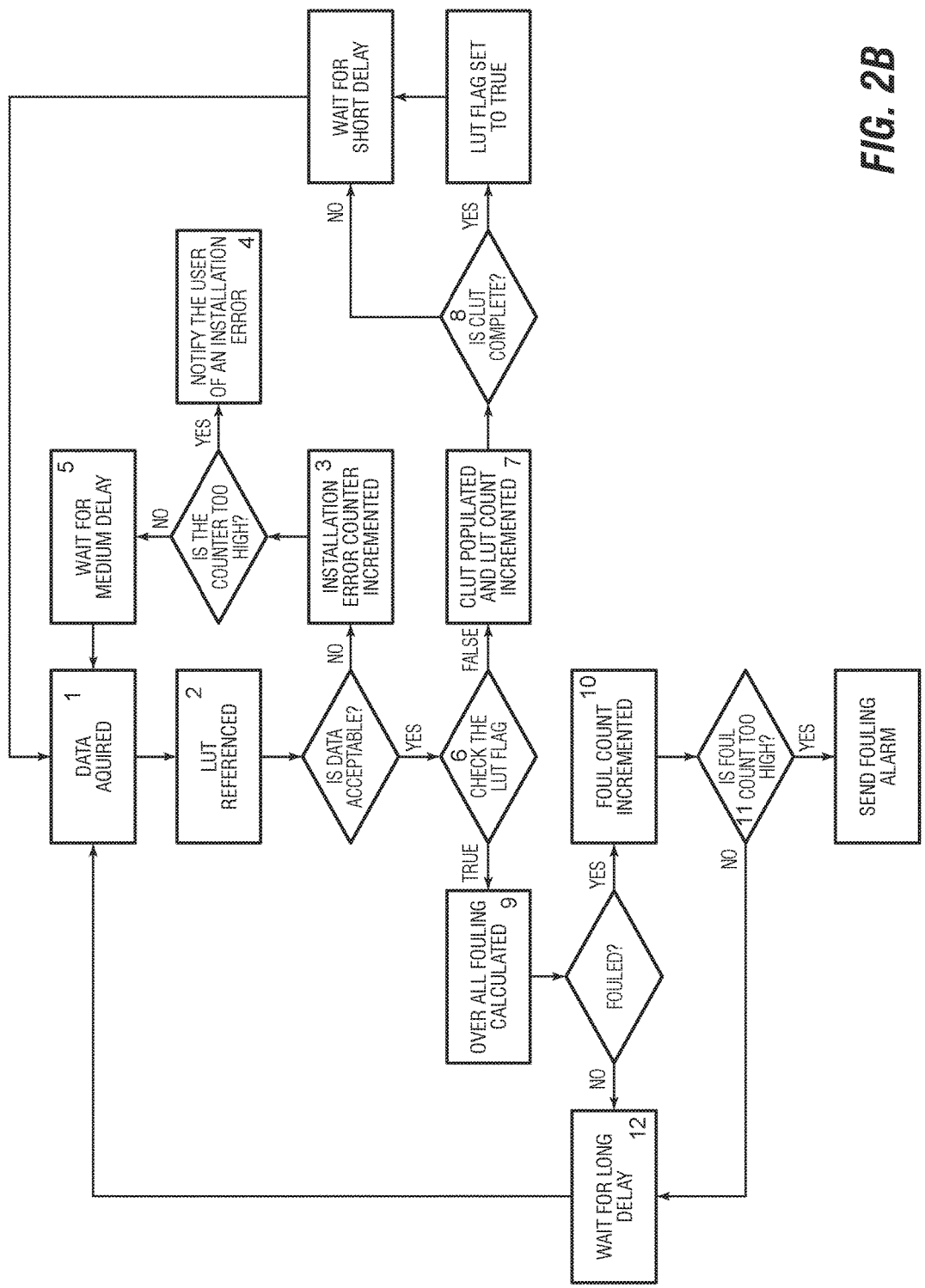
FIG. 2B shows a logic circuit decision tree operable as part of a monitoring module according to embodiments of the disclosure.

Referring now to FIGS. 2A and 2B together, a logic circuit process flow diagram and a logic circuit decision tree operable as part of a monitoring module, respectively, according to the embodiments of the disclosure, are shown. As illustrated and previously touched on, the monitoring module 1000 may include various hardware and software operable together as an overall 'logic circuit' in which logic of the present disclosure may be implemented.

The logic circuit may be programmable and compatible to various computer devices that include, for example, PCs, workstations, laptops, mobile devices, cell phones, tablets, PDAs, palm devices, servers, storages, and the like. Generally, in terms of hardware and related architecture, the logic circuit may include one or more microcontrollers 1006, memory or data storage 1028, and one or more I/O devices (not shown), which may all be operatively communicatively coupled together, including such as circuitry, pins, and via a local interface (not shown).

As would be apparent to one of skill in the art the local interface may be understood to include, for example, one or more buses or other wired or wireless connections. The local interface may have additional elements, such as controllers, buffers (caches), drivers, repeaters, and receivers, to enable communications. Further, the local interface may include address, control, and/or data connections to enable appropriate communications among the aforementioned components.

The logic circuit may receive power from a source, such as (upwards of) a 5V supplier. The power, which may be in the form of a voltage, may be regulated by regulator 1026. An example voltage regulator includes AC DC Converters_Recom Power RAC03-05SE/277 (85~305 VAC TO V). Power from the regulator 1026 may be fed to a power supply or battery 1027a. The battery 1027a may be a LiPo battery cell (1200 mAh, 3.7V). The battery 1027a may be charged by a battery charger 1027b. An example battery charger includes LiPo Energy Shield.

The microcontroller (or sometimes just 'controller') 1006 may be a hardware device configured for execution of software (programming, computer readable instructions, etc.), which may be stored (programed thereinto) in a controller memory. The controller 1006 may be any custom made or commercially available processor, a central processing unit (CPU), a digital signal processor (DSP), or an auxiliary processor among several processors associated therewith. As an example, the controller 1006 may be an Arduino MEGA 2560 microcontroller.

Microcontroller 1006 may be powered via the battery 1027a. In an embodiment, the microcontroller 1006 may be powered, directly or indirectly, via operation of the sensor(s) 1021. With power initiation, such as at startup of the monitoring module (1000), the controller 1006 may be in communicative operability with the SD storage 1028. An example SD storage includes Yun Shield.

The microcontroller 1006 may be in communicative operability with Wi-Fi module 1029. An example Wi-Fi module includes ESP8266 or particle photon.

The microcontroller 1006 may be in communicative operability with GSM module 1030. An example GSM module includes Arduino GSM Shield V2 or Particle Elctron.

The microcontroller 1006 may be in communicative operability with CAN-Bus module 1031. An example CAN-Bus module includes CAN-BUS shield with MCP2515 CAN bus controller.

The microcontroller 1006 may be in communicative operability with LEDs 1032.

The controller memory may include any one or combination of random access memory (RAM), dynamic random access memory (DRAM), static random access memory (SRAM), ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, and so forth. Moreover, the controller memory may incorporate electronic, magnetic, optical, and/or other types of storage media.

Software in the controller memory may include one or more separate programs, each of which may include an ordered listing of executable instructions for implementing logical functions. Software in the controller memory may include a suitable operating system (OS), compiler, source code, and/or one or more applications in accordance with embodiments herein. Software may be an application ("app") that may include numerous functional components for implementing the features and operations of embodiments of the disclosure.

The OS may be configured for execution control of other computer programs, and provides scheduling, input-output, file and data management, memory management, and communication control and related services. In aspects, the app may be suitable for implementation of embodiments herein to all commercially available operating systems.

Software may include an executable program, script, object code, source program, or any other comparable set of instructions to be performed.

Software may be written as object oriented programming language, which may have classes of data and methods, or a procedure programming language, which has routines, subroutines, and/or functions. The programming language may include for example Python, HTML, XHTML, Java, ADA, XML, C, C++, C#, Pascal, BASIC, API calls, ASP scripts, FORTRAN, COBOL, Perl, .NET, Ruby, and the like.

The input/output (I/O) device(s) may include an input device such as, for example, a mobile device, a keyboard, a mouse, a touchscreen, a microphone, a camera, a scanner, and so forth. The I/O device(s) may include an output device such as, for example, a display, a printer, an email, a text message, and so forth. The I/O device may include devices configurable to communicate both inputs and outputs, such as a router, a telephonic interface, a modulator/demodulator or NIC (that may be suitable to access remote devices, other files, devices, systems, or a network), a radio frequency (RF) or other transceiver, a bridge, and so forth. The I/O devices may include one or more components for communicating over various networks, such as the Internet or intranet.

In aspects, external computers (and respective programming) may be communicably operable with the logic circuit (and thus monitoring module 1000).

In operation of the logic circuit, the microcontroller may: execute software stored within the memory; communicate data to and from the memory; and/or generally control operations of the logic circuit pursuant to the software.

In Operation (with Logic)

The operation of the logic circuit may be further understood with an explanation of the tree diagram of FIG. 2B. The tasks are numbered in above the task name. Task 1 is to acquire data from the sensors 1021. Although sensor 1021 is referenced here, the logic circuit is not meant to be limited, and may be suitable for other sensors/sensor assemblies, such as sensor assembly 2000 discussed herein.

Task 1 may include sampling the data from the sensors 1021 over a short time (e.g., 60 seconds) and taking an average and standard deviation. Task 2 compares the standard deviation of the new data with a predetermined acceptable limit saved on a memory of the system. This allows sporadic or outlier data to be excluded. This consequently ensures that, for example, windy conditions will not be interpreted as fouling, and thus preventing false alarms.

If the sampled data is sporadic and not acceptable, a delay (task 5) will be implemented to retry (or loop) for data acquisition. Either the data will be acceptable or will remain sporadic. If the sporadic data is very consistent and the number of sporadic data occurrence exceeds a predefined value (task 3), the user is notified of an error (task 4) (typically an installation error).

Once the sampled data of task 1 has been accepted, it is checked with a lookup-table (LUT) flag (task 6), which is essentially a binary that allows for the completion of the fouling lookup-table. This flag indicates if the fouling lookup-table is already generated and exists or not (Initially and during installation, this flag is false, meaning that the table is not yet generated). If the LUT flag from task 6 is false, the programming uses an averaging method to create a fouling lookup-table containing the data output of the sensors 1021 (or sensor assemblies 2000) in a clean condition (tasks 7 and 8). After generating the LUT through multiple iterations (averaging), the system turns the LUT flag true.

If the LUT flag is true, the overall fouling is then calculated in task 9. This consists of referencing acquired data from the sensors 1021 (or assemblies 2000) against the fouling lookup-table which represents a clean condition. If fouling is evident, a foul state is recorded (task 10). In task 11, the fouled state is evaluated. If consecutive data has determined that the radiator is in a severe (as defined by the user) fouling condition, then the user will be notified using one or more of the defined warning methods (task 10), e.g., LED, email, J1939 message, etc. If the foul count is not too high, a delay will occur (task 12), and the system will continue to collect data to proactively warn the user in case of any fouling.

Referring now to FIG. 3, a side view of a monitored heat exchanger system that includes a monitoring module, a heat exchanger unit, and a heat generation device, operably coupled together, in accordance with embodiments disclosed herein, are shown. Embodiments herein apply to a heat exchanger unit that may be an inclusive assembly of a number of components and subcomponents. The heat exchanger unit 300 may be part of an overall system 301 that may be monitored. Monitored system 301 includes at least one monitoring module 1000, as described herein.

While it need not be exactly the same, system 301 may be like that of system 201 of FIGS. 1A-1C, and components thereof may be duplicate or analogous. Thus, only a brief discussion of system 301 is provided, recognizing that differences, if any, would be discernable by one of skill in the art, especially in view of U.S. Ser. No. 15/477,097 being incorporated herein by reference for all purposes. Accordingly it would be further understood that aspects of system 301 may include various additional improvements related to airflow, noise reduction, cooling efficiency, structural integrity, and combinations thereof. It is further noted that system 301 may include other sensor-type configurations, such as one or more sensor assemblies 2000 described herein.

The HX unit 300 may include one or more cores 306 being associated with respective monitoring module(s) 1000. It should be apparent that while HX unit 300 may have a plurality of sides (or side regions), each of the plurality of sides having respective coolers, not every side need have a monitoring module 1000. Still, it may every well be that every cooler is monitored via one or more modules 1000. Moreover, while the module 1000 may be particularly useful for monitoring fouling, other conditions of the HX unit 300 (or system 301) may be monitored.

One or more cores 306 may be associated with and proximate to a respective protective grate (not viewable), which may be useful for protecting fins of the core 306. The monitoring module 1000 may be installed in place of the grate.

Although not shown in entire detail here, the HX unit 300 may include a fan system. Briefly, the fan system may include related subcomponents, such as a fan that may be understood to include a rotating member with a plurality of fan blades extending therefrom. The fan may be operable by way of a suitable driver, such as a fan motor, which may be hydraulic, electrical, gas-powered, etc. Conduits may be configured for the transfer of pressurized hydraulic fluid to and from the motor. As such, pressurized hydraulic fluid may be used to power the motor.

The fan system may include a fan shroud, which may be generally annular. The fan shroud may be coupled to the frame via connection with the top plate. The shroud may include one or more lateral openings 360 to accommodate the passing of the mount bar 309 therethrough. The mount bar 309 may be a rigid bar or beam that extends from one side 359a of the HX unit 300 to another side 359b.

A fan rock guard 347 may be coupled to a shroud 313. The shroud 313 may be proximate to an aeroring (not shown). The aeroring may be annular in nature, and have a ring cross-section that may have a radius of curvature. Thus, the aeroring may have a rounded surface that may aid in improving airflow and reducing pressure in and around the fan system. Without the aeroring, eddies and other undesired airflow may occur in corners of the top of the frame.

The configuration of the shroud and aeroring may provide added ability for further streamlining airflow, which may beneficially reduce overall power requirements.

The fan system can be operable to draw in and direct the flow of air 316. The air 316 may be drawn through the sides of the HX unit 300 (and respective cores, which may then be used to cool one or more utility fluids F) and out as heated exhaust 318. The benefit of such a configuration is the ability to provide cooling in parallel, versus series. In a series configuration, the airflow becomes progressively hotter as it passes through each cooling circuit, resulting in a loss in cooling efficiency. This can be especially problematic where ambient air temperature is usually hotter, like Texas and Oklahoma.

Utility fluid F (or multiple F's) may include by way of example, lube oil, jacket water, turbo (such as for an engine), transmission fluid (such as for a pump), and hydraulic fluid (such as for the fan drive).

One of skill in the art would appreciate that airflow through the core 306 may be generally in a path parallel to a horizontal axis. In an analogous manner, the fan 308 may have an axis of rotation generally parallel to a vertical axis. Accordingly, airflow through the HX unit 300 may be transitioned from (approximately) horizontal to vertical as the airflow moves through the core 306 and out the fan exhaust 318.

As such, by way of example, utility fluid $F_1$ may be transferred from a heat generating device 303 at a hot temperature into an HX unit inlet 378, cooled with airflow via core 306, and transferred out of an HX unit outlet 384 back to the HGD 303 at a cooler temperature. While not meant to be limited, HGD 303 may be an engine, a genset, a motor, a pump, or other comparable equipment that operates in a manner whereby a utility fluid is heated.

There may be one or more cores 306. A 'cooler' or 'cooling circuit' may include one or more cores 306. The HX unit 300 may have between about 1 to about 8 cooling circuits, which each may be configured for cooling in parallel to each other.

The HX unit 300 may include various sound reduction or integrity features like that as described in pending U.S. patent application Ser. No. 15/477,097, such as various sound baffle configurations and/or flexible mount assemblies.

In operation, a utility fluid F from HGD 303 may be transferred into the HX unit 300. The transfer may be direct or indirect (such as from a holding tank). Within the unit 300, the fluid may flow into a tank chamber (not shown) via inlet 378 of inlet tank. The fluid then distributes into the various alternating layers and respective channels of the core 306.

Similarly airflow 316 may be drawn into HX unit 300, and into the various perpendicular and alternating layers and respective channels of the core 306. The HX unit 300 may be configured for passing atmospheric air through or in contact with the core 306, so as to reduce the temperature of the service fluid circulated through the core 306. In this respect, a fan (or fan system) may be rotatable about a fan axis so as to draw in (or suction, etc.) atmospheric air inwardly through channels (or fins 373), resulting in airflow through the core 306.

The service fluid $F_{1-hot}$, having a temperature hotter than the airflow, may be cooled (and conversely, the airflow warms). Cooled service fluid $F_{1-cold}$ leaves the cooling circuit via a fluid outlet 384. Various piping, tubing, etc. may be connected to the tank outlet 384, as may be desired for a particular application, and as would be apparent to one of skill in the art. In some aspects, the tank outlet 384 may be in fluid communication with an inlet of a subsequent cooling circuit also connected with the frame 302.

Cooled utility fluid may be returned from the HX unit 300 to a source tank, or directly to the HGD 303. Thus, service fluid from the HGD 303 may be circulated in a cooling circuit in a systematic and continuous manner. As will be appreciated, a suitable circulating pump (not shown) may be provided to circulate the service fluid through the core cooler 306.

Other coolers of the HX unit 300 may be generally similar in nature, and suitably configured for the cooling of various service fluids from the HGD 303.

Figure 4A:
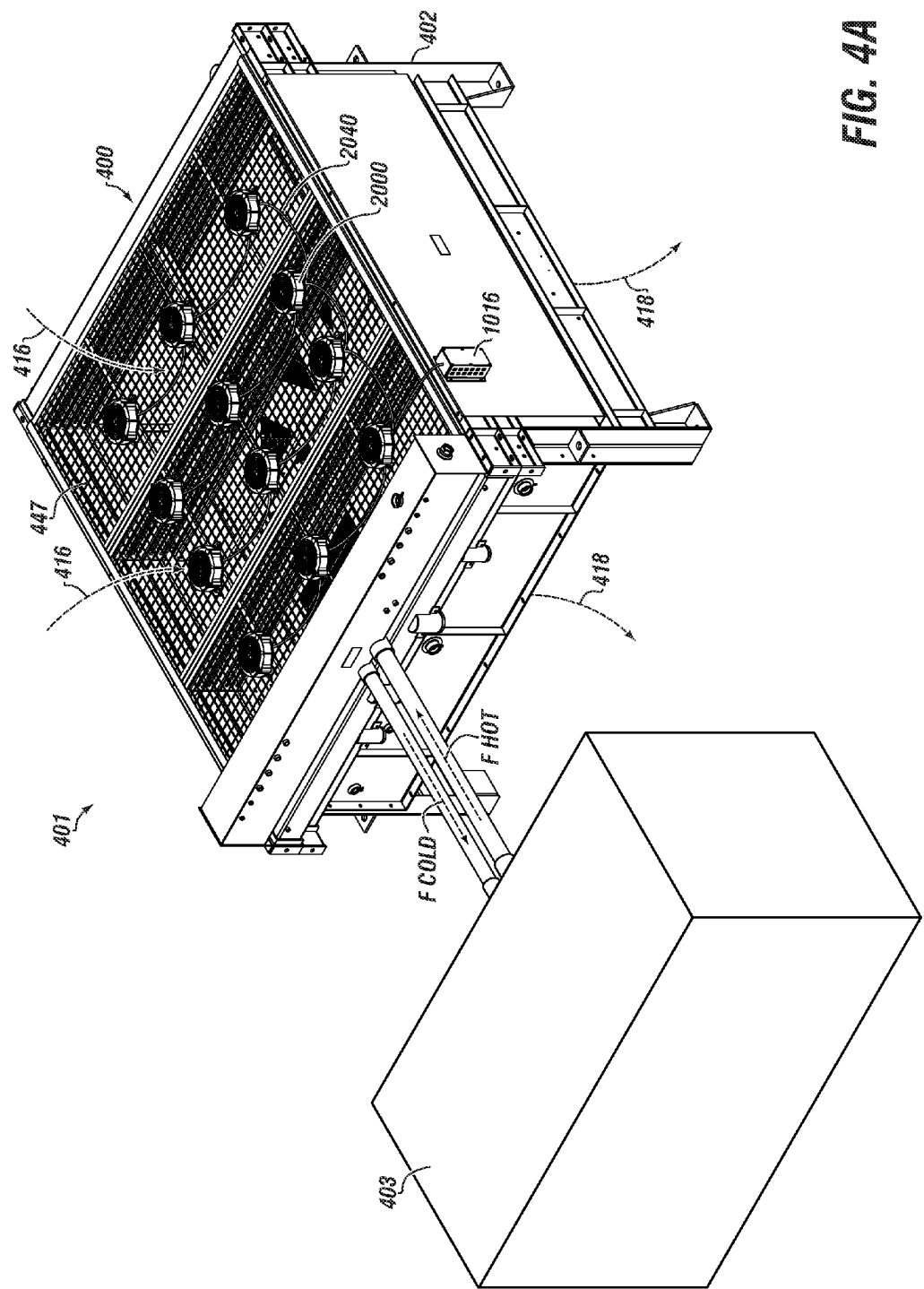
FIG. 4A shows a component breakout view of a sensor assembly usable with a monitoring module, and having various internal components according to embodiments of the disclosure.
Figure 4B:
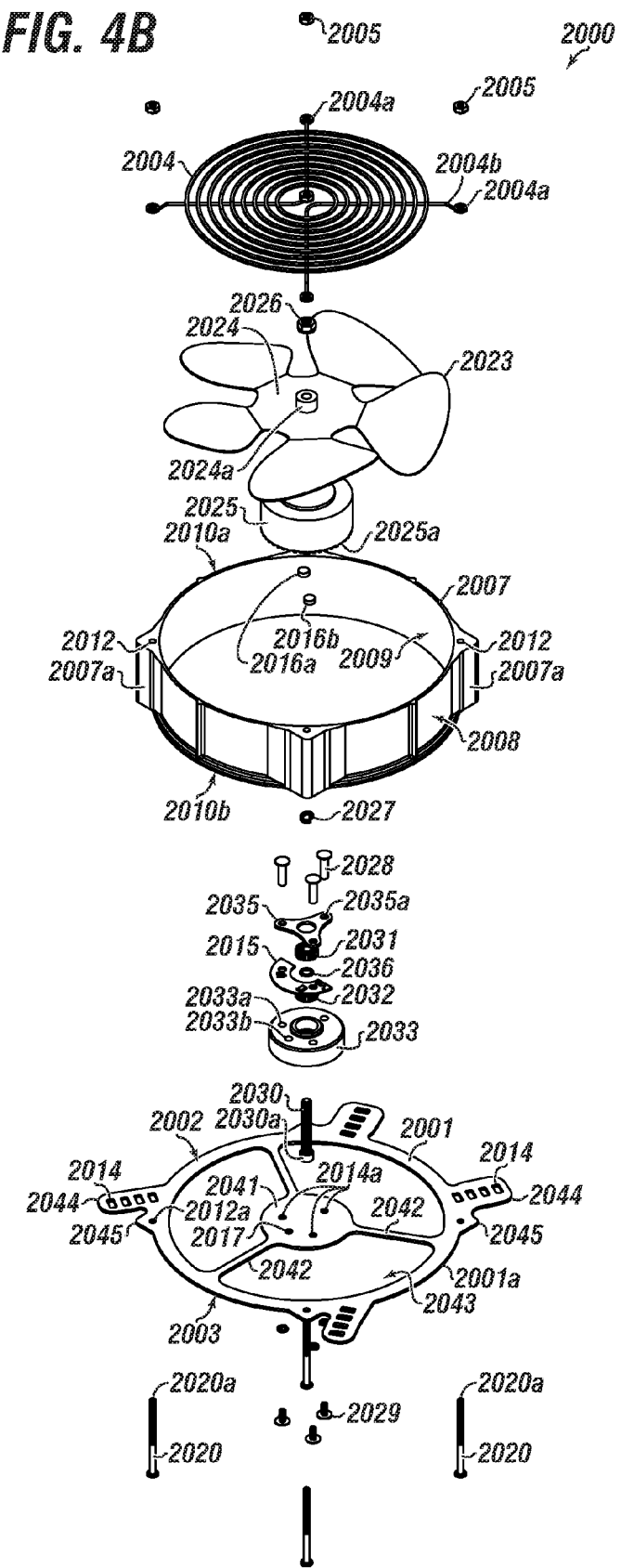
FIG. 4B shows a heat exchanger unit having a sensor assembly and a heat generation device operably coupled together according to embodiments of the disclosure.

Referring now to FIGS. 4A, 4B, and 4C together, an isometric view of a monitored heat exchanger system that includes an airflow sensor assembly, a heat exchanger unit, and a heat generation device operably coupled together, an isometric component breakout of an airflow sensor assembly, and a longitudinal cross-sectional view of an airflow sensor assembly, respectively, in accordance with embodiments disclosed herein, are shown.

Embodiments herein apply to a heat exchanger unit that may be an inclusive assembly of a number of components and subcomponents, which may be further associated with operable systems, subsystems, assemblies, modules, and so forth that may overall be referred to as a system, such as heat exchanger monitoring system 401 (or monitored heat exchanger system). System 401, and any components thereof, may be like that of other systems described herein or in the Applications. Thus, various discussion of system 401 may be provided in brevity, recognizing that differences, if any, would be discernable by one of skill in the art in accordance with the disclosure, as well as in view of the Applications. It would be further understood that aspects of system 401 may include various additional improvements related to airflow, noise reduction, cooling efficiency, structural integrity, cooler orientation or arrangement, and combinations thereof.

The heat exchanger unit (or HX unit) 400 may include a solid integral frame (or skeletal frame) or may be a frame 402 that includes a number of elements arranged and coupled together. FIG. 4A illustrates the HX unit 400 coupled with a heat generation device 403. HGD 403 is shown in 'box' form as a representation that the HGD 403 may be any such device suitable for heat exchange of a service fluid, as would be understood to one of skill in the art. Just the same the type of HX unit is not limited to the unit 400 depicted, as other types of units (such as multi-sided, vertical, etc.) are possible in accordance with embodiments herein and in the Applications.

As can be seen a hot service fluid $F_{hot}$ may circulate from the HGD 403 to the HX unit 400, be cooled via a core (also sometimes referred to as a cooler, cooling circuit, or radiator, or part thereof), and recirculate as a cooled service fluid $F_{cold}$ back to the HGD 403. Other equipment including other piping, valves, nozzles, pumps, tanks, etc. need not be shown, as one of skill in the art would have an understanding of coupling the HX unit 400 with the HGD 403 for operable transfer of one or more service fluids therefrom.

As shown system 401 may include the use of a sensor assembly 2000. There may be a plurality of sensor assemblies 2000 operably coupled together via a bus network 2040. Thus, wiring 2022 from any applicable assembly 2000 may connect with the bus network 2040, which may be passive in nature. The bus network 2040 may be associated with a communications protocol subject to RS-485 Protocol. A main cable of network 2040 may be directly connected to the primary microcontroller (1006, as described herein). The sensor assembly 2000 may be usable for or in connection with monitoring one or more conditions, properties, characteristics, etc. associated with the operation of the HX unit 400. As an example, the sensor assembly 2000 may be configured and usable (in connection with other various equipment) for measuring or helping determine fouling associated with a core (not shown here) of the unit 400.

The sensor assembly 2000 (or assemblies) may be operably coupled with the components of controller housing 1016 (including primary microcontroller 1006, etc.), thus having the same monitoring logic and so forth, as described herein and which may be further referenced in FIGS. 1B-1C and 2A-2B. For the sake of brevity, the reader is directed to the accompanying text, recognizing that one of skill in the art would readily appreciate and understand how to wire the components of the controller housing 1016 with the sensor assembly 2000, including associated programming, and various communication protocol (data transfer) and power. The controller housing 1016 may be mounted to the HX unit 400, and may be operable for the monitoring of the system 401.

The sensor assembly 2000 may be a modular assembly having various components and subcomponents associated and operable together, and like that described herein. The sensor assembly 2000 may be sized and optimized accordingly for operable coupling with any type of radiator, including that of the HX unit 400. The sensor assembly 2000 may be retrofitted to equipment already used in the field, or the sensor assembly 2000 may come associated and operably engaged with newly fabricated equipment.

The sensor assembly 2000 may be coupled to HX unit 400, including by direct coupling to a respective side/top thereof, such as, for example, to a rock guard 447. Although not meant to be limited, in aspects, the sensor assembly 2000 may have an assembly diameter in the range of about 5 inches to about 15 inches. Generally it may be desirable to have an assembly size that is large enough to effectively sense a condition, such as airflow, but small enough to avoid having detrimental effect on the operational capability of the HX unit 400 (e.g., by blocking or impeding airflow or increasing pressure drop). As such, spacing between respective assemblies 2000 may be done in a manner to minimize impact by the presence thereof.

FIG. 4B shows the sensor assembly 2000 may include a mounting frame 2001. The mounting frame 2001 may be made from a material suitable for rugged durability, such as metal. Although shown as being separate from a casing 2007, the frame 2001 and casing 2007 components could just as easily be integral to each other.

The mounting frame 2001 need not be limited to any particular shape, but in general the mounting frame 2001 may be a unitary piece having a first mounting frame (top) side 2002 and a second mounting frame (bottom) side 2003. In assembly, the casing 2007 may be proximate to the first frame side 2002, and the HX unit 400 may be proximate to the second side 2003. As shown, the frame 2001 may have a central segment 2041 joined with a ring-shape perimeter 2001*a* via one or more bridging members 2042. The mounting frame 2001 may thus have characteristics of being able to couple the assembly 2000 to the HX unit 400, support various components of the assembly 2000, and yet still have gaps 2043 for airflow to pass therethrough, thereby reducing the impact, if any, of the assembly 2000 on the operational capability of the HX unit 400.

The mounting frame 2001 may have one or more mounting arms 2044, which may extend outward from the perimeter 2001*a*. The mounting arms 2044 may be configured to provide the assembly 2000 with universal connectivity to a respective HX unit, which may have connection points (such as a rock guard 447) with varied features. In this respect, one or more of the mounting arms may have a series of mounting frame apertures 2014. As one of skill would appreciate a nut and bolt or other suitable fastener may be used for coupling the mounting frame 2001 with the HX unit, including to the rock grate.

Referring briefly to FIGS. 5A and 5B, which illustrates the universality of the mounting frame 2001 coupled with different shape rock grates 447 *a, b*. The sensor assembly 2000 may be connected to an HX unit by way of coupling the frame 2001 to a respective rock guard 447 *a, b*. Coupling may be via use of a plurality of fasteners 2050 (which may be nut-bolt or other suitable fastening type device) through apertures 2014, although one of skill in the art would appreciate there may be any number of ways to couple the assembly 2000 to the HX unit. Moreover, the coupling need not be limited to a rock grate, as other structures may be suitable.

Referring again to FIGS. 4A-4C, the mounting frame 2001 may have one or more dog ears 2045 extending outward from the perimeter 2001*a*. In aspects there may be about four dog ears 2045 positioned generally symmetrically around the perimeter 2001*a*, and may be proximate to respective arms 2044. The ears 2045 provide additional support, and also have frame apertures 2012*a* that align with respective casing apertures 2012 for connection therewith. That is, an assembly screw 2020 may be inserted into the frame aperture 2012*a* as it is aligned with the casing aperture 2012, whereby a screw end 2020*a* may extend out of the casing 2007 and a fastener 2005 may then be screwed thereon.

In embodiments the assembly may also include a guard 2004. The guard 2004 may provide an additional layer of protection, including against inadvertent touching of assembly components, as well as preventing larger debris from entering into the assembly 2000. Although shown as having a 'grill' configuration, the configuration of the guard 2004 is not meant to be limited. The guard 2004 may be of a shape suitable for not attributing to significant pressure drop or impeding airflow through the sensor assembly 2000. The guard 2004 may have one or more guard apertures 2004*a* that may align with respective apertures 2012, 2012*a*. The apertures 2004*a* may be disposed on ends of respective guard mount legs 2004*b*. The legs 2004*b* may be 'raised' in a manner where a slight clearance is provided between the guard 2004 and the blades 2023 of a rotating member 2024.

Accordingly, the screw end 2020*a* may be interested through the apertures 2004*a*, 2012, 2012*a*, and have the respective fastener 2005 tightened thereon. Although the Figures illustrate a grouping of four respective screws/apertures/fasteners, embodiments herein are not meant to be limited, as other configurations are possible.

The central segment 2041 may have one or more segment apertures 2014*a*. The central segment may also have a segment wiring aperture 2017 suitable for wiring 2022 to pass therethrough. Wiring 2022 may having a bundle configuration whereby one or more wires are associated therewith, including for communication protocol (data/signal transfer) and power.

The casing 2007 may be an integral piece having a casing outer side 2008, a casing inside 2009, a casing topside 2010*a*, and a casing bottom side 2010*b*. The casing 2007 may have a shape corresponding to that of the mounting frame 2014, such as generally ring-shaped. Although not meant to be limited, the height between the topside 2010*a* and the bottom side 2010*b* may be about 1 inch to about 5 inches.

Similarly, although not limited there may be a casing thickness of material between the outer side 2008 and the inside 2009 in the range of about 0.1 inches to about 0.5 inches. The casing thickness may be suitable for casing apertures 2012 to be disposed therein. As shown, there may be one or more casing ears 2007*a* extending outward from the outer side 2008, which may further correspond to respective frame ears 2045. The apertures 2012 may be formed in the respective ears 2007*a*.

One of skill would appreciate the mounting frame 2001 may be connected to the HX unit via insertion of a plurality of connectors (fasteners, etc.) through apertures 2014 and an applicable surface (or other feature) of the HX unit 400, such as the rock guard 447. Moreover, although shown mounted external to the rock guard 447, the assemblies 2000 could just as well have an internal mounting (such as on the inner side of the rock guard 447). In this respect the assembly 2000 may be easily attachable and removable from the HX unit 400. This may be for example, by way of screws, nut/bolt, quick disconnect, etc. The sensor assembly 2000 may be mounted to the HX unit 400 in a vicinity of where airflow 416 may occur in sufficient amount to move the rotating member 2024.

The casing 2007 may be connected to the mounting frame 2001 via insertion of screws 2020 through respective apertures 2012 and 2012a. The use of a separable mounting frame 2001 and casing 2007 may provide for simple connect and disconnect from each other, which may make it easier for tasks such as maintenance or cleaning, as well as access to, and assembly of, inner components.

The sensor assembly 2000 may be referred to as an airflow sensor assembly, in that the operation of sensor assembly 2000 may help measure, determine, or otherwise sense airflow 416 moving into (or out of) the HX unit 400. In aspects, there may be about 1 to about 25 sensor assemblies 2000 associated with a respective side of the HX unit 400. However, the number of assemblies 2000 is not meant to be limited, and may change depending on desired monitoring requirements for a given type of heat exchanger.

Inner components of the sensor assembly 2000 may disposed within the casing 2007, and further supported by the central segment 2041. The assembly 2000 may be operated in a manner to sense airflow into the HX unit 400, which may be as a result of suction or blowing. The sensor assembly 2000 may be operated and setup to detect airflow through the HX unit (or respective core) during a clean, unfouled state, which may then be used as a baseline. As the HX unit 400 fouls, airflow therethrough may be effected, and the electrical signal generated by the sensor assembly 2000 will have a measurable, detectable change in signal strength.

The configuration (including its size, type placement, etc.) and operation of the sensor assembly 2000 is believed of significance, whereby the sensor assembly 2000 (and its components) may need to be robust and durable, yet not of any (or as minimal as possible) effect on the operation of the HX unit 400. For example, sensing airflow with an orifice-type sensor may result in plugging thereof, and ultimately failure and inability to measure airflow. Other sensors that are large or bulky may be cost prohibitive and/or attribute to unacceptable pressure drop attributable to the monitoring module. Still other sensors may be prone to breakage, or otherwise susceptible to conditions associated with the HX unit 400, which include the impact of airflow (sometimes in the range of 20-30 meters-per-second [mps]) on the sensor assembly 2000 and/or the hot temperatures. In aspects, during normal cooling operation, the speed of the airflow 416 may be in the range of about 20 to about 35 mps.

FIGS. 4B and 4C together show a durable and rugged sensor assembly 2000 that may include the rotating member 2024 (rotatable around an axis) with a plurality of blade members 2023 extending radially therefrom. The blade members 2023 may be configured to induce movement of the rotating member 2024 (rotatable about an axis) much in the same way the blades of a windmill function. That is, upon movement of air thereby and thereagainst, at least a minor amount of force (the amount of force being dependent upon the amount of movement (speed) of airflow) will be felt by the blade members 2023, and as a result of being connected to the rotating member 2024, induce rotation of the member 2024. In aspects the shape and design of the blade members 2023 may be that which is sensitive to airflow, including with various blade curvature and/or rounded surfaces, as well as the number of blades and spacing therebetween.

The rotating member 2024 may be disposed around a shaft 2030, which may be centrally positioned within the casing 2007. In a non-limiting example, the shaft 2030 may be a bolt with threaded and/or non-threaded regions, and a bolt head 2030a. As shown, other components of the assembly 2000 may be disposed around and in proximity to the shaft 2030. It would be apparent to one of skill that the shaft 2030 may be directly connected with other components that may move or are otherwise rotatable, but the shaft 2030 may not be directly connected with other components that are fixed in place. Thus, the shaft 2030 may rotate freely.

There may be a support platform 2033. While not meant to be limited, the platform 2033 may be made from a metal such as aluminum, which has the benefits of being economical, resistance to corrosion, and non-ferromagnetic. As will be described, the use of non-ferromagnetic material is of significance as the assembly 2000 uses properties of magnetism.

The support platform 2033 may shaped and sized in a manner to generally correspond to the size and shape of the central segment 2041. The support platform 2033 may be cylindrical in shape. The support platform 2033 may have one or more platform apertures 2033a configured to align with segment apertures 2014a. Thus the support platform 2033 may be coupled to the central segment 2041, such as by way of one or more binding post 2028 and binding screw 2029 combinations. As shown, there may be about three binding posts 2028 with respective binding screws 2029 that may threadingly engage to each other. The posts 2028 and screws 2029 may be spaced apart generally equidistantly in order to distribute forces between the components as they are coupled together, and during operation of the assembly 2000.

The support platform 2033 may have a middle hollowed region (or "platform hollow") 2051 that may accommodate for the positioning of the platform around the shaft 2030, as well as the proximate positioning of one or more bearings 2031, 2032 therein. Because of the tight tolerance fit of the bearings 2031, 2032 within the hollowed region (and tight tolerance fit of the shaft 2030 within an inner ring of the bearings), as well downward pressure from tightening of fastener 2027 (exerting a pressure against bolt head 2030a), the shaft 2030 may be freely rotatable, but otherwise prevented from moving or having undesired wobble or slippage.

While not limiting, it is generally thought that for size and performance two bearings 2031, 2032 may be optimal. Though the first bearing 2031 may be placed proximately above second bearing 2032, it may be useful to have a shim 2036 positioned therebetween. The shim 2036 may help distribute pressure evenly. In aspects, the bearings 2031, 2032 may be ABEC rated between 1 and 9, and have an inner diameter of at least 0.1 inches and outer diameter of less than 0.8 inches. In other aspects, the inner diameter is about 0.25 inches and the outer diameter is about 0.63 inches.

The support platform 2033 may have an additional platform aperture 2033b for which wiring 2022 can pass therethrough. As shown the support platform 2033 may have a circuit board 2015 coupled therewith. The circuit board 2015 may be mounted or otherwise disposed on a top platform surface 2052 of the support platform 2033.

Figure 5C:
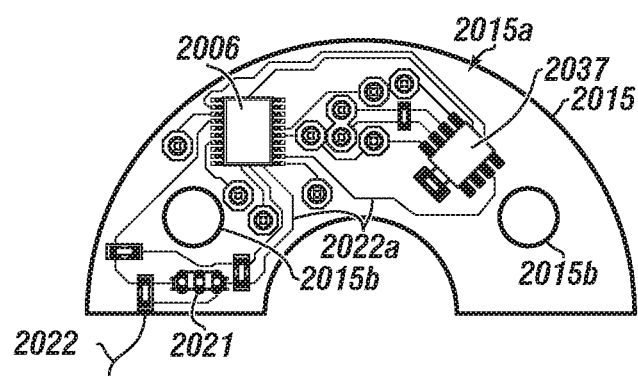
FIG. 5C shows a view of a circuit board with circuitry and circuit components according to embodiments of the disclosure.

Referring briefly at FIG. 5C a downward view of a circuit board with various components and circuitry, in accordance with embodiments disclosed herein, is shown. Although not limited, the circuit board 2015 may have a shape, to correspond with fitting onto the support platform 2033. As shown, the circuit board may have a half-moon or half-donut type shape, and generally configured to accommodate positioning at least partially around the shaft 2030.

The circuit board 2015 may have various conductivity paths 2022a and circuit components associated therewith, and may be powered by way of connectivity with network bus 2040. As seen on the top of the board 2015a, there may be a Hall sensor 2021 (with respective Hall element), a microcontroller 2006, and a transceiver (or transceiver IC) 2037, all in operable connectivity, and having associated computer instructions.

The Hall sensor 2021 may be akin to a magnetic switch latch like latch TO92UA manufactured by Melexis Technologies NV. Although not limited, the sensor 2021 may be a thin piece of rectangular p-type semiconductor material such as gallium arsenide (GaAs), indium antimonide (InSb) or indium arsenide (InAs), subjected to passing of a continuous current therethrough.

The microcontroller 2006 may be, for example, an 8-bit AVR RISC-based microchip like the ATtiny167 microcontroller manufactured by Microchip. This microcontroller 2006, which may be referred to as a secondary microcontroller, may have the ability to provide some calculation, filtering, and so forth, as it pertains to the signal generated from the Hall sensor 2021. The resultant signal may then be communicated to the primary microcontroller 1006 for additional processing.

The transceiver 2037 may be accommodate operation of the communications protocol. For example, the transceiver 2037 may be suitable to function as a pseudo-translator to conform generated signals to be useable with the communications protocol. By way of example, the transceiver 2037 may be like that of a MAX3485AEASA+ manufactured by Maxim Integrated.

Referring again to FIGS. 4A-4C, the circuit board 2015 may have one or more board apertures 2015b for respective posts 2028 and screws 2029 to pass therethrough. Thus upon sufficient tightening the circuit board 2015 may be held rigidly and securely in place on the support platform 2033. Fastener 2027 (which may be a lock nut or nut with lock washer) may also be used to provide sufficient pressure between the circuit board 2015, the bearings 2031, 2032, and the support platform 2033.

There may be an additional support plate 2035 disposed around the shaft 2030 and coupled with the support platform 2033. While not limited, the support plate 2035 may be made of corrosive-resistant, non-ferromagnetic metal, such as stainless steel. As various components of the assembly 2000 may be susceptible to expansion as a result of surrounding heat, while others are not, the support plate 2035 may help aid in keeping the effect of gaps resulting therefrom minimized.

The support plate 2035 may have support plate apertures 2035a for respective posts 2028 and screws 2029 to pass therethrough. Thus upon sufficient tightening, the plate 2035 may be held rigidly and securely in place, and further sandwich the circuit board 2015 on the support platform 2033. The use of the support plate 2035 may further help in preventing slippage within the assembly. It may be especially desired to prevent slippage between the shaft and the inner ring surfaces of the bearings 2031, 2032, as well as to prevent slippage between the outer ring surfaces of the bearings 2031, 2032.

Although not limited to any particular shape, the support plate 2035 may have a tri-wing configuration, as shown in FIG. 4B.

As the circuit board 2015 and components proximate thereto may be sensitive to the surrounding environment, including dust or other particulate, the assembly 2000 may include a protective inner housing 2025. The inner housing 2025 may be generally cylindrical, and otherwise shaped in a manner for fitting around the shaft 2030, and at least partially down and around the support platform 2033 (and also surrounding components coupled with the support platform 2033). Although they may be possibly located elsewhere, the inner housing 2025 may have one or more magnets fixedly attached therewith, such as magnets 2016a and 2016b. The magnets 2016 a,b may be attached to the inside (underside) of inner housing 2025 with a high temperature adhesive.

The magnets 2016 a,b may be attached to the insider upper surface of the inner housing 2025, and thus be oriented in a manner to come into proximity with the Hall sensor element 2021. As they pass each other there may be a clearance between the sensor element 2021 and the magnets 2016 a,b in the range of about 1 mm to about 10 mm. However, the size of the clearance is not meant to be limited, and may be a suitable size to provide sufficient interaction between the magnets 2016 a,b and the sensor element 2021. The magnets 2016 a,b and the sensor element 2021 may be disposed and arranged in a manner whereby as the magnets 2016 a,b rotate, the magnets 2016 are sufficiently able to repeatedly (cyclically) effect the magnetic field of the sensor element 2021.

The rotating member 2024 may be disposed around the shaft 2030, and proximate to the inner housing 2025. The rotating member 2024 may have a rotating member ring 2024a that fits around the 2030, and provides sufficient amount of material whereby a set screw (or comparable) (not shown here) may be inserted therethrough and tightened against the shaft 2030. In addition to the downward pressure from tightened locknuts, the use of the set screw may help provide removably fixed connected between the rotating member 2024 and the shaft 2030. Top fastener 2027a may be threadingly engaged onto shaft end 2030b in a manner to provide sufficiently desired pressure between the components disposed around the shaft 2030, including member ring 2024a and inner housing 2025.

The rotating member 2024 may be movingly associated with the bearings 2031, 2032, whereby the rotating member 2024 may be freely movable with respect to the support platform 2033 (and components coupled thereto). Although not shown here, it could be the case that the rotating member 2024 may be configured to rotate around the shaft 2030 while the shaft is held stationary. This could occur, for example, by configuring the rotating member 2024 with one or more bearings, and the inner ring of the bearings disposed around the shaft 2030.

Accordingly, as airflow (416) impacts the blades 2023, the rotating member 2024 may be urged to move (rotate). As the rotating member 2024 rotates, so does the shaft 2030 and any components fixedly connected thereto, including inner housing 2025. As the housing 2025 rotates, so too will the magnets 2016 a,b. Although not limited to any particular number of magnets, the use of two promotes efficiency in generating a true digital signal related to the rotation of the shaft 2030.

Figure 5D:
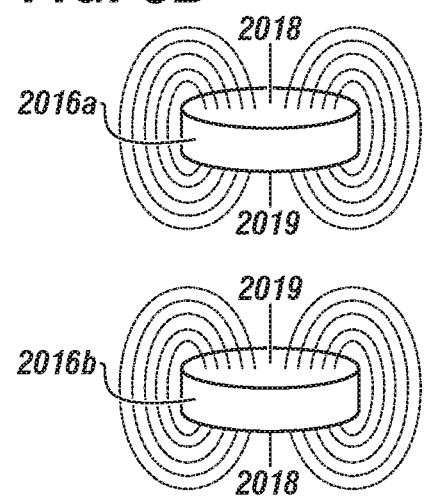
FIG. 5D shows a view of a circuit board with circuitry and circuit components according to embodiments of the disclosure.

Referring briefly to FIG. 5D, an example of magnets having oppositely positioned poles, according to embodiments of the disclosure, is shown. As illustrated, one of the magnets 2016a may have a North/South pole 2018/2019 configuration, whereas the other magnet 2016b may have a South/North pole 2019/2018 configuration.

In an operational example, the magnet 2016a may pass the Hall sensor element 2021, thereby effecting the magnetic field of the element in a manner to generate therefrom a first digital signal akin to a '1'. Next, when the magnet 2016b passes the sensor element 2021, the magnetic field is effected in an opposite matter, thus resulting in the digital signal changing to a low or a '0'. As the magnets 2016 a,b pass through the magnetic field of the Hall sensor element 2021, the field is disrupted, and a change in the current occurs, as would be known by one of skill in the art as the "Hall effect". The circuitry associated with Hall sensor elements may be configured to generate the digital signal, which may then be processed by the secondary microcontroller 2006, and subsequently communicated to the primary microcontroller 1006. The frequency of the digital signal may be proportional the amount (i.e., speed) of rotation, and thus proportional the rate of airflow.

Although sensor assembly 2000 has been shown and described, embodiments herein are not meant to be limited as other ways of obtaining information about the operation of the HX unit 400 are possible.

Referring now to FIG. 6, a cross-sectional view of an alternative sensor assembly according to embodiments of the disclosure, is shown.

Sensor assembly 2000a, and any components thereof, may be like that of other sensor assemblies described herein, such as assembly 2000. Thus, various discussion of assembly 2000a may be provided in brevity, recognizing that differences, if any, would be discernable by one of skill in the art in accordance with the disclosure, as well as in view of the Applications.

Briefly, assembly 2000a may have a shaft 2030 with various components disposed therearound, including support platform 2030, one or more bearings 2031, 2032, circuit board 2015, and so forth. As shown, the support plate 2035 may have a generally horizontal portion 2046. The horizontal portion 2046 may be tightened against a lower ridge 2048 of a retainer insert 2047 via binding post 2028 and screw 2029. The retainer insert 2047 may be useable to further constrain the bearings 2031 and/or 2032 from wobble or slippage. The retainer insert 2047 may have an upper ridge 2049, whereby as the support plate 2035 compresses against the lower ridge 2048, compression may also be incurred by upper ridge 2049 to the outer ring of the bearings 2031, 2032.

Referring again to FIGS. 4A-4C, although not shown in detail here, the HX unit 400 may include one or more cores being associated with one or more sensor assemblies 2000. It should be apparent that while HX unit 400 may have a plurality of cooling regions (side, sides, topside, etc.), each having respective coolers, not every region need have sensor assembly 2000. Still, it may every well be that every cooler is monitored via or otherwise operatively associated with one or more assemblies 2000. Moreover, while the sensor assembly 2000 may be particularly useful for monitoring fouling, other conditions of the HX unit 400 (or system 401) may be monitored.

One or more cores may be associated with and proximate to a respective protective grate, which may be useful for protecting fins a core.

Although not shown in entire detail here, the HX unit 400 may include a fan system. Briefly, the fan system may include related subcomponents, such as a fan that may be understood to include a rotating member with a plurality of fan blades extending therefrom. The fan may be operable by way of a suitable driver, such as a fan motor, which may be hydraulic, electrical, gas-powered, etc. Conduits may be configured for the transfer of pressurized hydraulic fluid to and from the motor. As such, pressurized hydraulic fluid may be used to power the motor. The fan system may include a fan shroud, which may be generally annular. The fan system may have features and an operational configuration like that as described in pending U.S. patent application Ser. No. 15/477,097.

The fan system can be operable to draw in and direct the flow of air 416. The air 416 may be drawn through the top or sides of the HX unit 400 (and respective cores, which may then be used to cool one or more utility fluids F) as may be applicable, and out as heated exhaust 418.

Utility fluid F (or multiple F's) may include by way of example, lube oil, jacket water, turbo (such as for an engine), transmission fluid (such as for a pump), and hydraulic fluid (such as for the fan drive).

While not meant to be limited, HGD 403 may be an engine, a genset, a motor, a pump, or other comparable equipment that operates in a manner whereby a utility fluid is heated.

Embodiments herein provide for a system (and related method of operating or using the system) using on or more components described herein. For example, such a system may include a wellbore and other wellbore and production equipment, as well as a frac trailer. The frac trailer may include a frac pump, a HGD, and a HX unit as pertaining to the disclosure.

Other embodiments herein provide for a method of doing business related to a monitored heat exchanger system. The method may include the steps of having a customer relationship between a provider and recipient (i.e., customer, client, etc.). The method may include charging a one-time or ongoing fee related to the monitored system. The provider may install the monitored heat exchanger system as a new standalone skid. Alternatively, the provider may retrofit existing equipment for operable communication with a monitoring module as described herein. Thus, in embodiments there may be a first transaction related to equipment purchase or use, followed by a second transaction related to installation.

Another part of transaction, or alternatively, a separate transaction, may pertain to a license for the use software (or programming) related to a logic circuit, as the provider may own copyright in the respective software (or be an exclusive licensee).

The provider may provide services and equipment directly, or may use a subcontractor.

Once a recipient has completed its applicable transaction, and the system has been associated with monitoring functionality, the recipient may be provided with the capability to track and monitor one or more characteristics or properties respective to an individual heat exchanger unit performance. Reported information (or parameters) may include percentage of fouling, time between warnings, cleaning frequency, etc). This information may be groupable by location or region to see if one is performing better than another. The system may also indicate them how many units are in green, yellow or red, which may further help identify problem regions, operators etc.

The method may further include a field service component. That is, the provider, or affiliated field service business, may be able to offer (give, etc.) a solution, whereby the monitored system sends out an alarm of some variation, such as SMS/text, email, etc. In this respect the recipient has the option to address the alarm, or have the provider tend to. In other words, in the event the monitored system provides a warning about, for example, a dirty radiator, the recipient is prompted to find a remedy that can alleviate or mitigate process downtime.

The business method may thus include steps pertaining to receiving a warning via the monitoring module, and selecting a remediation option, such as cleaning with dry ice or a pressure washer or in their yard when the pump comes back in from the field. In aspects, these steps may be handled remotely and/or off the jobsite. Accordingly, the recipient need not even have to take any action, as the provider may handle all steps.

The business method may include providing an incentivized transaction if the monitoring module is used with a HX unit that is sold by the provider. The monitoring module may have components as described herein, and the HX unit may likewise have components of any HX unit described herein.

Advantages

Embodiments of the disclosure advantageously provide for an improved heat exchanger unit useable with a wide array of heat generating devices.

Embodiments of the disclosure advantageously provide for new and innovative systems, hardware, software, and related methods, for monitoring a heat exchanger unit. An associated monitoring module may beneficially be retrofitted to existing equipment. Sensors of the module are configured for precision, and in conjunction with a microcontroller, are able together to accurately measure characteristics of a heat exchanger in real-time. In particular, the characteristic may be fouling. The ability to accurately warn of fouling alleviates the need for conventional and cumbersome remediation methods.

Embodiments of the disclosure advantageously provide for a new and durable sensor assembly useable in a wide range of external environments where heat exchanger units are often used.

The heat exchanger unit of the disclosure may provide for the ability to reduce sound attributable to a point source, such as a fan. The fan may have a dominant acoustic frequency that may be reduced by at least 10 decibels. The heat exchanger unit may be configured with a particular baffle configuration that helps reduce sound. The baffles may be configured to have or contain a sound absorbing material. At the same time the baffle configuration may help drastically improve streamlined airflow, which further helps reduce sound emission and improves overall efficiency of the heat exchanger unit because of lowered power requirements.

The heat exchanger unit may advantageously provide for the ability to simultaneously cool multiple utility fluids in parallel.

Advantages of the disclosure provide for a compact design with more heat transfer area in limited space, more heat transfer capability, reduced overall height by arranging heat exchanger cores at all four sides in general cube shape.

Embodiments of the disclosure advantageously provide for the ability to improve structural integrity of a heat exchanger unit. A radiator core of the unit may have an increased mass on a core end that may substantially prohibit or eliminate runoff of brazing material during a welding process.

The heat exchanger unit may provide for the ability to provide an 'absorber' effect with any thermal expansion. That is, one or more components may be coupled together via the use of a flex amount assembly, the assembly having a deformable member associated therewith. As thermal expansion occurs, the deformable member may deform resulting to absorb the expansion motion or stress.

Advantages herein may provide for a more convenient and realizable welding practice for core and tank, and a more convenient and flexible mount assembly.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure presented herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of any claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A monitored heat exchanger system, the system comprising:
    a heat exchanger unit in operable engagement with a heat generating device, with an at least one service fluid being transferable therebetween, the heat exchanger unit further comprising:
        a frame; and at least one cooler coupled with the frame, the at least one cooler having an airflow side and a service fluid side;
    a monitoring module coupled to the heat exchanger unit, the monitoring module further comprising: a primary microcontroller in operable communication with an at least one sensor assembly,
    wherein the at least one sensor assembly comprises:
        a mounting frame;
        a support platform coupled with the mounting frame, and further comprising: a platform hollow; and a top platform surface;
        a circuit board positioned onto the top platform surface, the circuit board being configured with a secondary microcontroller and a Hall effect sensor;
        an inner sensor housing configured to extend out and around the circuit board and the support platform;
        a first magnet coupled to an underside of the inner sensor housing; and
        a rotating member comprising a plurality of blades, the rotating member being disposed on top of the inner sensor housing, wherein the primary microcontroller is provided with computer instructions for processing a system signal received from the secondary microcontroller.

2. The monitored heat exchanger system of claim 1, wherein the monitoring module comprises a plurality of sensor assemblies, with each of the plurality of sensor assemblies having a respective secondary microcontroller in operable communication with the primary microcontroller.

3. The monitored heat exchanger system of claim 1, wherein the system signal pertains to an amount of fouling associated with the airflow side of the at least one cooler.

4. The monitored heat exchanger system of claim 1, wherein the monitoring module further comprises each of a solid data storage, a Wi-Fi module, a GSM module, and a CAN-Bus module being disposed within a controller housing and in operable communication with the primary microcontroller, and wherein the primary microcontroller is provided with computer instructions for communicating with one or more of the solid data storage, the Wi-Fi module, the GSM module, and the CAN-Bus module.

5. The monitored heat exchanger system of claim 1, wherein the primary microcontroller is configured with computer instructions for performing the tasks of:
   acquiring a set of data from the at least one sensor assembly;
   sampling the set of data over a predetermined period of time;
   computing an average and a standard deviation of the set of data;
   comparing the standard deviation with predetermined data;
   determining whether the set of data is acceptable within a defined parameter;
   determining whether a first lookup table comprising a set of lookup data has been completed, and creating the first lookup table using an averaging method if it has not;
   comparing the set of data to the set of lookup data; and
   providing an indication based on a result of the comparing the set of data to the set of lookup data step.

6. The monitored heat exchanger system of claim 1, wherein the system signal pertains to an amount of fouling associated with the airflow side of the at least one cooler, and wherein the at least one service fluid comprises one of lube oil, hydraulic fluid, fuel, charge air, transmission fluid, jacket water, and engine cooler, wherein the heat generation device is a diesel engine.

7. The monitored heat exchanger system of claim 1, wherein the sensor assembly further comprises:
   a casing comprising: a casing outer surface, a casing inner surface, a casing topside, and a casing bottom side, and a casing opening, the mounting frame being disposed proximate to the casing bottom side;
   a guard disposed proximate to the casing topside;
   a shaft centrally positioned within the casing opening, the support platform being disposed around the shaft;
   a plurality of assembly screws disposed through the casing, the mounting frame, and the guard;
   a plurality of fasteners configured for connecting with the plurality of assembly screws;
   a first bearing disposed around the shaft in a bearing annulus between the shaft and the support platform; and
   a second bearing disposed around the shaft in a bearing annulus between the shaft and the support platform.

8. A monitored heat exchanger system, the system comprising:
   a heat exchanger unit in operable engagement with a heat generating device, with an at least one service fluid transferable therebetween, the heat exchanger unit further comprising:
      a frame; and at least one cooler coupled with the frame, the at least one cooler having an airflow side and a service fluid side;
   a monitoring module coupled to the heat exchanger unit, the monitoring module further comprising: a primary microcontroller in operable communication with an at least one sensor assembly,
   wherein the at least one sensor assembly comprises:
      a mounting frame;
      a support platform coupled with the mounting frame, and further comprising: a platform hollow; and a top platform surface;
      a circuit board coupled with the top platform surface, the circuit board being configured with a secondary microcontroller and a Hall effect sensor;
      an inner sensor housing configured to extend out and around the circuit board and the support platform;
      a first magnet coupled to an underside of the inner sensor housing; and
      a rotating member disposed on top of the inner sensor housing,
   wherein the primary microcontroller is provided with computer instructions for processing a system signal received from the secondary microcontroller, wherein the system signal pertains to an amount of fouling associated with the airflow side of the at least one cooler.

9. The monitored heat exchanger system of claim 8, wherein the monitoring module comprises a plurality of sensor assemblies, with each of the plurality of sensor assemblies having a respective secondary microcontroller in operable communication with the primary microcontroller.

10. The monitored heat exchanger system of claim 8, wherein the monitoring module further comprises each of a solid data storage, a Wi-Fi module, a GSM module, and a CAN-Bus module being in operable communication with the primary microcontroller.

11. The monitored heat exchanger system of claim 10, wherein the primary microcontroller is configured with computer instructions for performing the tasks of:
   acquiring a set of data from the at least one sensor assembly;
   sampling the set of data over a predetermined period of time;
   computing an average and a standard deviation of the set of data;
   comparing the standard deviation with predetermined data;
   determining whether the set of data is acceptable within a defined parameter;
   determining whether a first lookup table comprising a set of lookup data has been completed, and creating the first lookup table using an averaging method if it has not;
   comparing the set of data to the set of lookup data; and
   providing an indication based on a result of the comparing the set of data to the set of lookup data step.

12. The monitored heat exchanger system of claim 11, wherein the set of data comprises a signal proportional to an amount of rotation of the rotating member.

13. The monitored heat exchanger system of claim 12, wherein the at least one service fluid comprises one of lube oil, hydraulic fluid, fuel, charge air, transmission fluid, jacket water, and engine cooler, wherein the heat generation device is a diesel engine.

14. The monitored heat exchanger system of claim 8, wherein the sensor assembly further comprises:
- a casing comprising: a casing outer surface, a casing inner surface, a casing topside, and a casing bottom side, and a casing opening, the mounting frame being disposed proximate to the casing bottom side;
- a guard disposed proximate to the casing topside;
- a shaft centrally positioned within the casing opening, the support platform being disposed around the shaft;
- a plurality of assembly screws disposed through the casing, the mounting frame, and the guard;
- a plurality of fasteners configured for connecting with the plurality of assembly screws; and
- a first bearing disposed around the shaft in a bearing annulus between the shaft and the support platform.

15. The monitored heat exchanger system of claim 8, wherein the heat exchanger unit further comprises a fan operating to draw in ambient air through the airflow side in a sufficient manner to cause a reduction in temperature of the at least one service fluid.

16. A monitored heat exchanger system, the system comprising:
- a heat exchanger unit in operable engagement with a heat generating device, with an at least one service fluid transferable therebetween, the heat exchanger unit further comprising:
  - a frame; and at least one cooler coupled with the frame, the at least one cooler having an airflow side and a service fluid side;
- a monitoring module coupled to the heat exchanger unit, the monitoring module further comprising: a primary microcontroller in operable communication with an at least one sensor assembly,
- wherein the at least one sensor assembly comprises:
  - a mounting frame;
  - a support platform coupled with the mounting frame, and further comprising: a platform hollow; and a top platform surface;
  - a circuit board coupled with the top platform surface, the circuit board being configured with a secondary microcontroller and a Hall effect sensor;
  - an inner sensor housing configured to extend out and around the circuit board and the support platform;
  - a first magnet coupled to an underside of the inner sensor housing; and
  - a rotating member disposed on top of the inner sensor housing,
- wherein the primary microcontroller is provided with computer instructions for processing a system signal received from the secondary microcontroller, wherein the system signal pertains to an amount of fouling associated with the airflow side of the at least one cooler, wherein the heat exchanger unit further comprises a fan operating to draw in ambient air through the airflow side in a sufficient manner to cause a reduction in temperature of the at least one service fluid, and wherein the at least one service fluid comprises one of lube oil, hydraulic fluid, fuel, charge air, transmission fluid, jacket water, and engine cooler.

17. The monitored heat exchanger system of claim 16, wherein the monitoring module comprises a plurality of sensor assemblies, with each of the plurality of sensor assemblies having a respective secondary microcontroller in operable communication with the primary microcontroller.

18. The monitored heat exchanger system of claim 17, wherein the monitoring module further comprises each of a solid data storage, a Wi-Fi module, a GSM module, and a CAN-Bus module being in operable communication with the primary microcontroller.

19. The monitored heat exchanger system of claim 18, wherein the primary microcontroller is configured with computer instructions for performing the tasks of:
- acquiring a set of data from the at least one sensor assembly;
- sampling the set of data over a predetermined period of time;
- computing an average and a standard deviation of the set of data;
- comparing the standard deviation with predetermined data;
- determining whether the set of data is acceptable within a defined parameter;
- determining whether a first lookup table comprising a set of lookup data has been completed, and creating the first lookup table using an averaging method if it has not;
- comparing the set of data to the set of lookup data; and
- providing an indication based on a result of the comparing the set of data to the set of lookup data step.

20. The monitored heat exchanger system of claim 19, wherein the set of data comprises a signal proportional to an amount of rotation of the rotating member, and wherein the sensor assembly further comprises:
- a casing comprising: a casing outer surface, a casing inner surface, a casing topside, and a casing bottom side, and a casing opening, the mounting frame being disposed proximate to the casing bottom side;
- a guard disposed proximate to the casing topside;
- a shaft centrally positioned within the casing opening, the support platform being disposed around the shaft;
- a plurality of assembly screws disposed through the casing, the mounting frame, and the guard;
- a plurality of fasteners configured for connecting with the plurality of assembly screws;
- a first bearing disposed around the shaft in a bearing annulus between the shaft and the support platform; and
- a second bearing disposed around the shaft in a bearing annulus between the shaft and the support platform.

\* \* \* \* \*